(12) United States Patent
Nicholas et al.

(10) Patent No.: US 12,291,336 B2
(45) Date of Patent: *May 6, 2025

(54) PASSENGER SEATING ARRANGEMENT HAVING ACCESS FOR DISABLED PASSENGERS

(71) Applicant: UNITED AIRLINES, INC., Chicago, IL (US)

(72) Inventors: Richard Peter John Nicholas, London (GB); Ian Hamilton Dryburgh, London (GB); John David Henry McKeever, London (GB)

(73) Assignee: UNITED AIRLINES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,992

(22) Filed: Apr. 20, 2023

(65) Prior Publication Data

US 2023/0382535 A1 Nov. 30, 2023

Related U.S. Application Data

(63) Continuation of application No. 17/043,451, filed as application No. PCT/GB2018/053560 on Dec. 7, (Continued)

(30) Foreign Application Priority Data

Mar. 30, 2018 (GB) ...................................... 1805328

(51) Int. Cl.
*B64D 11/06* (2006.01)

(52) U.S. Cl.
CPC ...... *B64D 11/0641* (2014.12); *B64D 11/0601* (2014.12); *B64D 11/0604* (2014.12); *B64D 11/0606* (2014.12); *B64D 11/0605* (2014.12)

(58) Field of Classification Search
CPC .................................................. B64D 11/0641
See application file for complete search history.

(56) References Cited

U.S. PATENT DOCUMENTS

| | | | |
|---|---|---|---|
| 5,954,401 | A | 9/1999 | Koch et al. |
| 7,178,871 | B1 | 2/2007 | Round et al. |
| | | (Continued) | |

FOREIGN PATENT DOCUMENTS

| | | |
|---|---|---|
| EP | 0053012 A1 | 6/1982 |
| EP | 2907754 A1 | 8/2015 |
| | (Continued) | |

OTHER PUBLICATIONS

Clark, "Thompson Vantage Solo Offers a New Herringbone Option for Narrow-bodies", 4 pages (2017).

(Continued)

*Primary Examiner* — Anthony D Barfield
(74) *Attorney, Agent, or Firm* — MARSHALL, GERSTEIN & BORUN LLP

(57) ABSTRACT

A passenger seating arrangement includes at least one seat unit configurable into a disabled-access configuration in which an access opening is temporarily widened to enable a disabled passenger to access the seat unit. The seat unit is arranged with other seat units in a column, and each seat unit is configurable between a seating configuration and a flat-bed configuration. The seat units are arranged in an inwardly facing herringbone. A method of providing access for a disabled passenger to a seat unit includes temporarily widening an access opening.

13 Claims, 27 Drawing Sheets

Related U.S. Application Data 2018, now Pat. No. 11,655,037, which is a continuation of application No. 16/162,176, filed on Oct. 16, 2018, now Pat. No. 10,501,188.

(56) References Cited

U.S. PATENT DOCUMENTS

| | | |
|---|---|---|
| 7,918,504 B2 | 4/2011 | Thompson |
| 8,690,254 B2 | 4/2014 | Cailleteau |
| 2008/0088160 A1 | 4/2008 | Johnson |
| 2011/0186682 A1 | 8/2011 | Collins et al. |
| 2012/0298798 A1 | 11/2012 | Henshaw et al. |
| 2015/0136905 A1 | 5/2015 | Orson |
| 2015/0175266 A1 | 6/2015 | Ferry |
| 2017/0327232 A1 | 11/2017 | Morgan |
| 2019/0210733 A1 | 7/2019 | Herault et al. |

FOREIGN PATENT DOCUMENTS

| | | |
|---|---|---|
| FR | 2928624 A1 | 9/2009 |
| GB | 2326824 A | 1/1999 |
| GB | 2405791 A | 3/2005 |
| GB | 2510765 A | 8/2014 |
| WO | WO-03/013903 A1 | 2/2003 |
| WO | WO-2008/046027 A1 | 4/2008 |
| WO | WO-2014115107 A1 | 7/2014 |
| WO | WO-2017/067409 A1 | 4/2017 |
| WO | WO-2018/033599 A1 | 2/2018 |
| WO | WO-2018/078377 A1 | 5/2018 |

OTHER PUBLICATIONS

European Search Report from European Application No. 18210993. 4, 3 pages (2019).

Flynn "the Next Generation in Airbus, Boeing single-aisle business class," 12 pages (2017).

International Search Report and Written Opinion from International Application No. PCT/GB2018/053560, 15 pages (2019).

United Kingdom Search Report from Application No. GB1805328. 0, 1 page (2018).

Singapore Written Opinion for Application No. 11202009343X, dated Jan. 21, 2022.

Singapore Written Opinion for Application No. 11202009350X, dated Jan. 11, 2022.

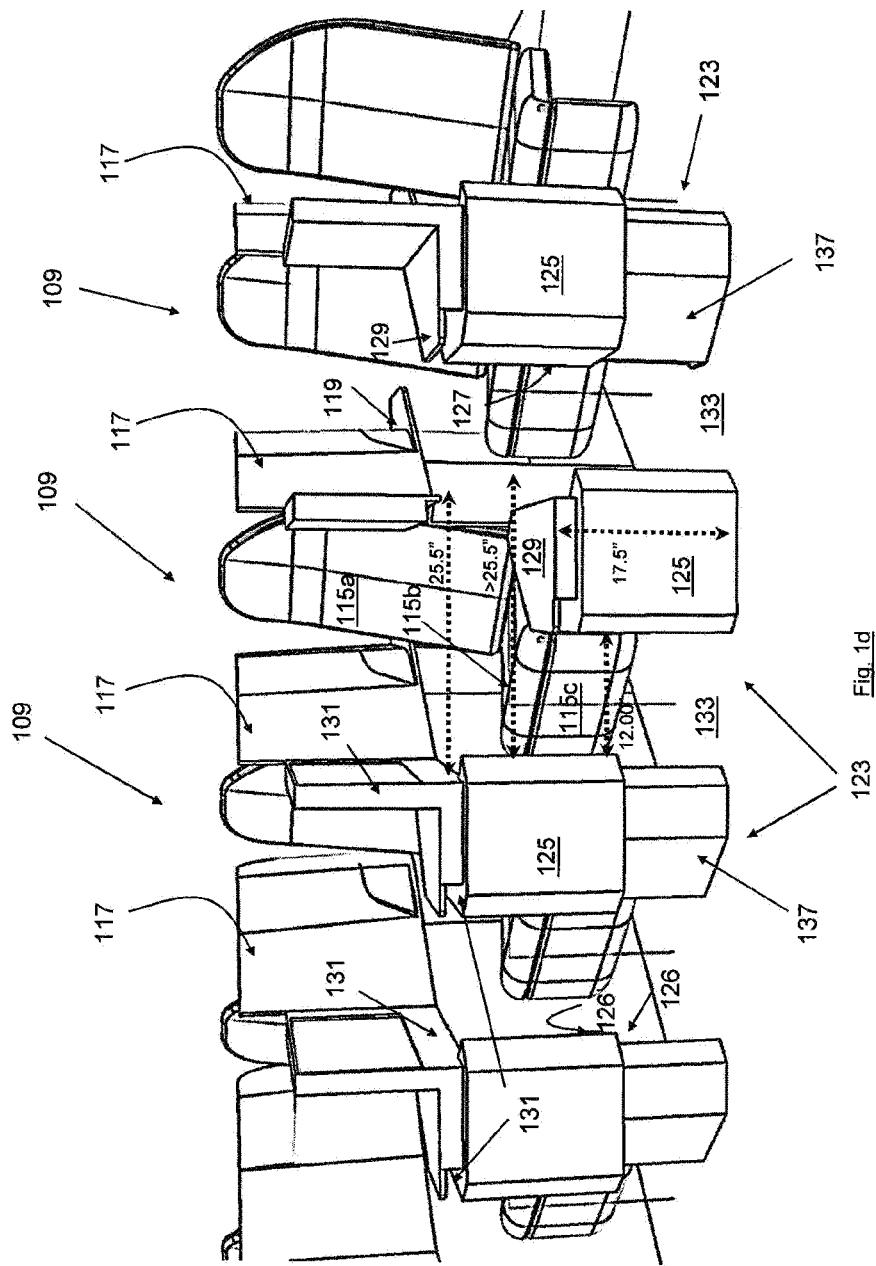

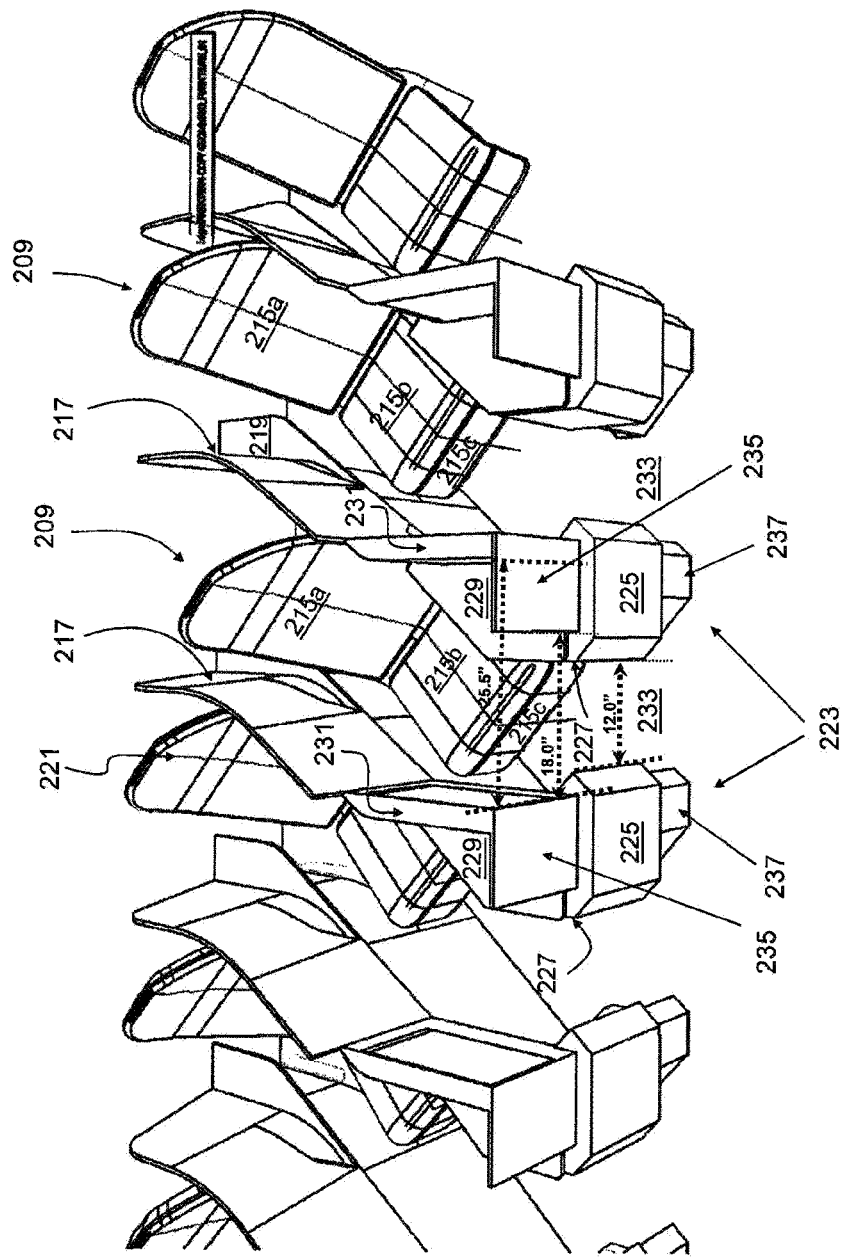

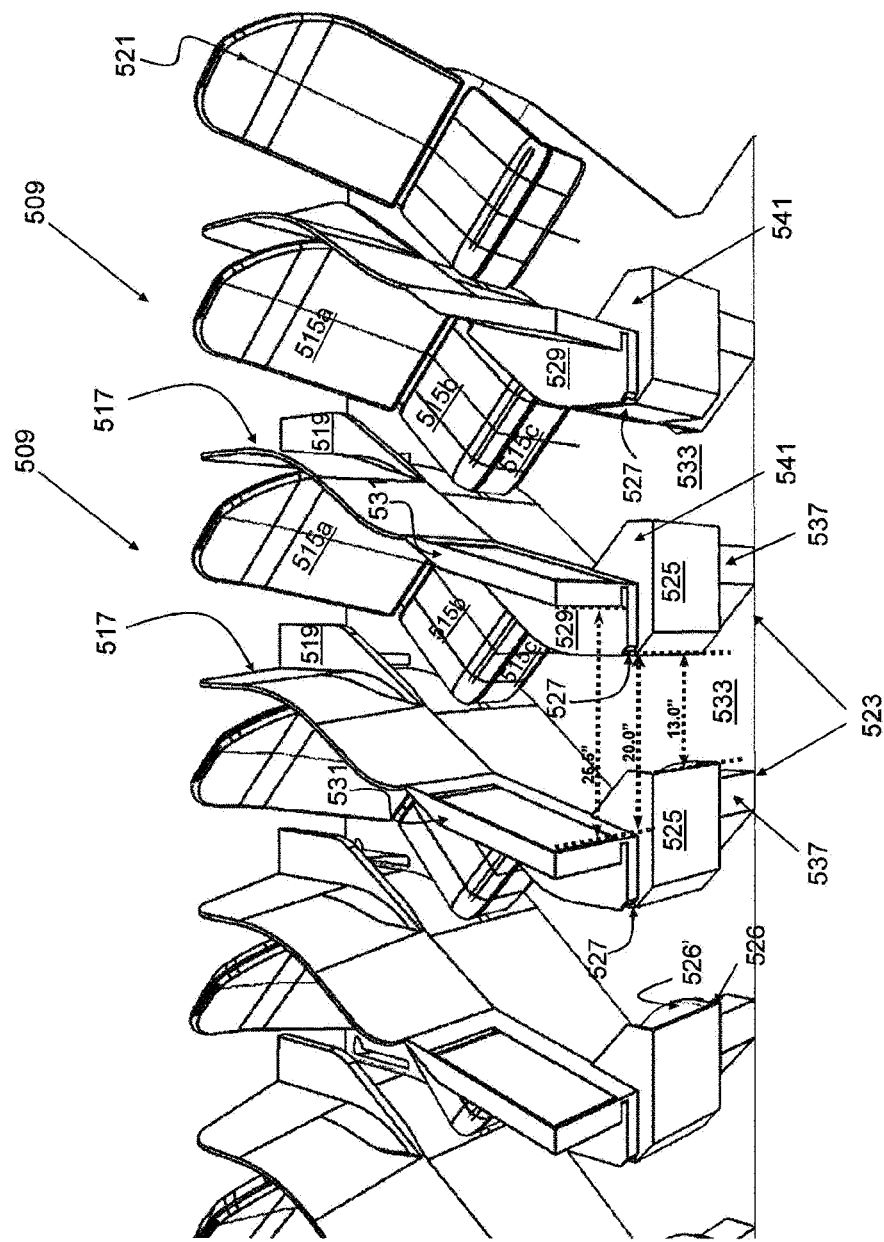

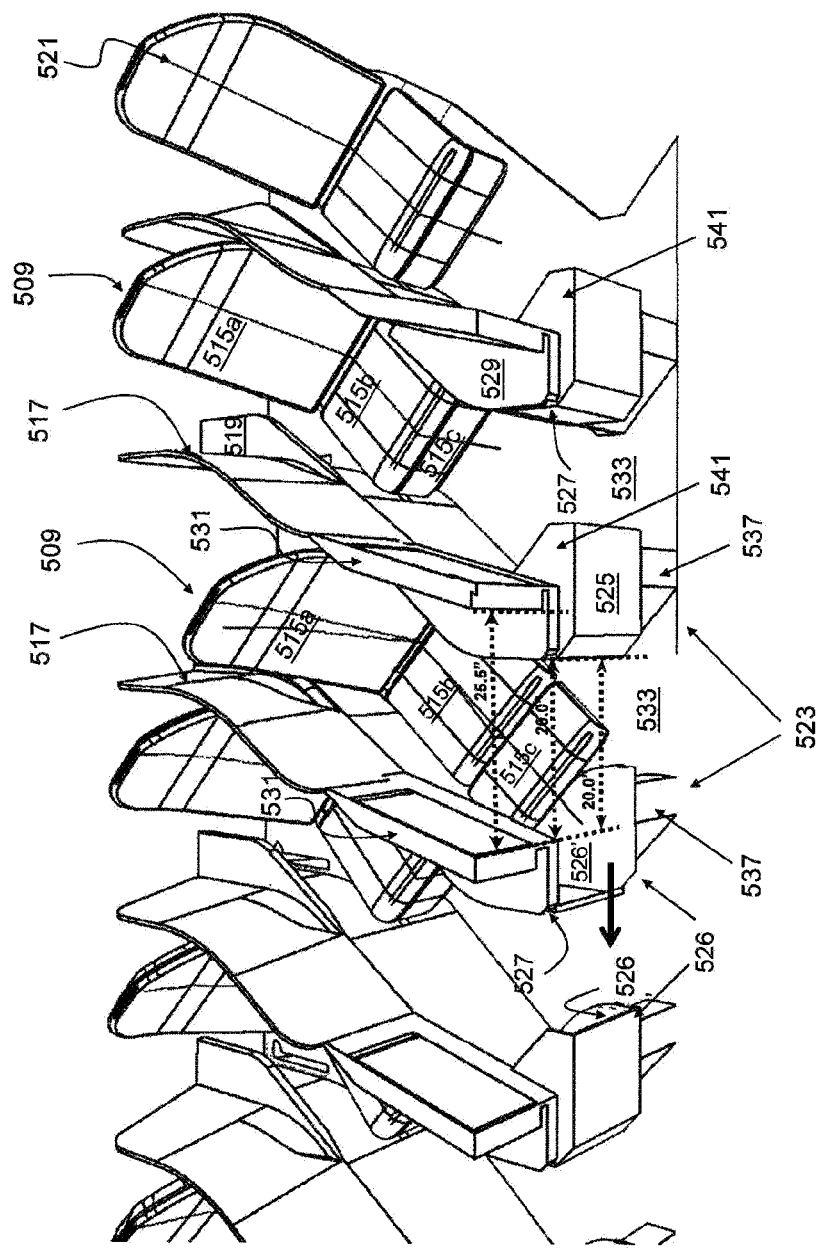

PASSENGER SEATING ARRANGEMENT HAVING ACCESS FOR DISABLED PASSENGERS

CROSS-REFERENCE TO RELATED APPLICATIONS

This application is a continuation of U.S. application Ser. No. 17/043,451 now U.S. Pat. No. 11,644,037, filed Sep. 29, 2020 and entitled "A Passenger Seating Arrangement Having Access for Disabled Passengers," which is a national phase of International Application No. PCT/GB2018/053560 filed Dec. 7, 2018 and entitled "A Passenger Seating Arrangement Having Access for Disabled Passengers," which is a continuation of U.S. application Ser. No. 16/162,176 now U.S. Pat. No. 10,501,188 filed Oct. 16, 2018, and which claims the benefit of the filing date of GB Application No. 1805328.0 filed Mar. 30, 2018 entitled "A Passenger Seating Arrangement Having Access for Disabled Passengers," the entirety of which are herein expressly incorporated by reference.

FIELD OF THE INVENTION

The present invention relates to a passenger seating arrangement, and to sets of seat units for use in a passenger seating arrangement.

BACKGROUND OF THE INVENTION

Aircraft passenger seating arrangements having convertible seat units that have both a seat configuration, and a flat-bed configuration are well-known. These convertible seat units are typically provided in premium class (e.g. business class and/or first class) cabins of an aircraft. In the seat configuration, the seat unit typically provides a relatively upright seat, whereas in the flat-bed configuration, the seat unit tends to provide a substantially planar sleeping surface for supporting the passenger. The seat units shown in GB2326824 (British Airways), WO03013903 (Virgin Atlantic) and U.S. Pat. No. 7,178,871 (British Airways) are examples of such convertible seat units (often referred to as having 'lie-flat' seats) that have both a seat configuration, and a flat-bed configuration which offers improved comfort over a reclined seat. Lie-flat seats have been increasingly popular over the last decade or so.

Legislation, such as the Air Carrier Access legislation in the USA, prohibits discrimination on the basis of disability in air travel. For example, Title 14 CFR Part 382 sets out the rules followed by the US Department of Transportation (DOT) for all flights of U.S. airlines, and to flights to or from the United States by foreign airlines.

In many premium class seating arrangements, the DOT requirements tend to be inherently met because access to the seats tends to already be relatively spacious as a result of the relatively large seat units/low PAX-density (i.e. low numbers of passengers per unit area in the cabin), that are desirable within business or first class.

GB2326824 and WO03013903 mentioned above are examples of so-called herringbone arrangements in a business class arrangement, in which the seats are orientated at an angle to the longitudinal axis of the aircraft. For arrangements requiring relatively high herringbone angles/low pitches, the width of the access opening for each seat in this type of herringbone arrangement may necessarily become relatively narrow (i.e. the spacing between adjacent foot-ends of the seat units becomes correspondingly narrow as the herringbone angle increases/pitch decreases). This narrow width of the access opening may become problematic for compliance with the above-mentioned DOT requirements. This is especially the case on narrow-body (e.g. single-aisle) aircraft, where high angle/low pitch arrangements tend to be needed in order to efficiently use the available cabin space.

In this respect, herringbone layouts for narrow-body aircraft have tended to be dismissed within the aircraft industry as impractical because the required access width has been thought to be unachievable. Instead, there tends to be a preference for in-line arrangements such as those suggested in U.S. Pat. No. 7,918,504 (Thompson). U.S. Pat. No. 7,918,504 discloses an aircraft cabin in which there are rows of seat units, each unit having a forward facing lie-flat seat that faces in a direction parallel to the longitudinal axis of the cabin.

The present invention seeks to mitigate the above-mentioned problems. Alternatively or additionally, the present invention seeks to provide an improved passenger seating arrangement.

SUMMARY OF THE INVENTION

In an embodiment, there is provided a passenger seating arrangement in an aircraft cabin the passenger seating arrangement comprising a column of seat units located adjacent an aisle, the column of seat units and the aisle both extending in a longitudinal direction parallel to the longitudinal axis of the aircraft cabin. The column comprises a plurality, and preferably a multiplicity, of seat units, arranged consecutively along the longitudinal direction. Each seat unit comprises a plurality of moveable seating elements such that the seat unit is configurable between a seating configuration in which the seating elements are arranged to form a seat having a seat pan and seat back, and a flat-bed configuration in which the seating elements are arranged to form a surface for a flat-bed. In each seat unit, the seating elements are orientated at an acute angle to the longitudinal direction and face inwardly towards the aisle. Each seat unit comprises a structure, for example a foot-receiving structure for receiving the feet of a passenger when the unit is in a flat-bed configuration. The spacing between this structure (for example the foot-receiving structure) of a seat unit and the structure (for example the foot-receiving structure) of a seat unit to one side of it in the column, may define an access opening to the seat unit. The access opening has a first width for access by an able-bodied passenger. At least one of the seat units is configurable into a disabled-access configuration in which an access opening is temporarily widened from the first width to a second width, greater than the first width, for enabling a disabled passenger to access a seat unit. \

By providing an access opening that can be widened to a second width, a relatively space-efficient seating arrangement can be provided, whilst still enabling access for disabled passengers when required. The disabled access configuration allows a disabled passenger access to the seat unit in a dignified manner.

It will be appreciated that the term 'disabled' may be interchangeable with synonymous terminology. For example, a disabled passenger may also be referred to as a Person of Reduced mobility (PRM).

In the disabled-access configuration, the access opening is temporarily widened. After the passenger's access or egress to/from the seat unit, the seat unit may be reconfigured out of the disabled-access configuration.

The at least one seat unit is configurable into the disabled-access configuration such that the access opening can be widened. In the disabled-access configuration, the access opening may be temporarily widened. After the passenger's access or egress to/from the seat unit, the seat unit may be reconfigured out of the disabled-access configuration. The seat unit is preferably repeatedly configurable into/out of the disabled-access configuration. For example the seat unit may be repeatedly configurable between an able-bodied access configuration (typically the default configuration), and the disabled-access configuration. It will be appreciated that the access opening can therefore be repeatedly widened/narrowed between the first and second widths as required for repeated access/egress to/from the seat unit.

Unless otherwise specified, features of the seat unit are typically described herein with reference to their arrangement in the able-bodied access configuration. Unless otherwise specified, a description of moving the seat unit to the disabled-access configuration, is typically made with reference to movement away from the able-bodied configuration.

Reference herein is made to an access opening. It will be appreciated that the access opening may also be used for egress from the seat unit. Features of the access opening may be equally applicable to when the opening is an egress opening, for example when a passenger exits a seat unit.

In some embodiments, the access opening may be between the foot-receiving structure of a seat unit and the foot-receiving structure of a seat unit to one side of it in the column. In principle, only one of the seat units may have a feature that enables the opening to be temporarily widened (for example one (or part of one), but not necessarily both (or part of both), of the foot-receiving structures may be moveable). In some embodiments the seat unit for which disabled access is enabled may, therefore, be adjacent to a seat unit that is moved to the disabled-access configuration. In other embodiments the seat unit that adopts the disabled-access configuration may be the same seat unit that is accessed by the disabled passenger.

A plurality of the seat units may be configurable into the disabled-access configuration, for enabling disabled access to a plurality of the seat units. A plurality, and preferably a multiplicity, of the seat units may be configurable into the disabled-access configuration, for enabling disabled access to at least 50% of the seat units. All of the multiplicity of seat units may be configurable into the disabled-access configuration. Of the seat units that are configurable into the disabled-access configuration, those seat units are preferably substantially identical. Preferably all of the seat units are substantially identical.

In some embodiments, the spacing between the foot-receiving structure of a seat unit and the foot-receiving structure of a seat unit to one side of it in the column, may define the access opening to the seat unit. The access opening for a given seat unit may be defined between the foot-receiving structure of that seat unit and the foot-receiving structure of the aft-seat unit behind it in the column. This may be the case for some forward-facing herringbone arrangements for example. The access opening for a given seat unit may be defined between the foot-receiving structure of that seat unit and the foot-receiving structure of the fore-seat unit in front of it in the column. This may be the case for some rearward-facing herringbone arrangements for example.

In each seat unit, the seating elements are orientated at an acute angle to the longitudinal direction and face inwardly towards the aisle. Such an arrangement is typically referred to as an inwardly facing herringbone arrangement. Each set of seating elements, and more preferably each seat unit, may comprise a central axis. The central axis preferably extends through the centre of the seating elements (for example it may bisect a seat pan and/or back-rest of the seat when in the seating configuration). In some, examples, the central axis is fixed, while in other examples, the central axis may be movable, such as a with swivel seats using a rotating axis. The angle of the seating elements is preferably defined as the angle between the central axis and the longitudinal direction. In some embodiments, the angle of the seating elements may be defined as the angle between a line defining the maximum useable bed length, and the longitudinal direction.

In some embodiments, the width of the access opening may vary with height from the cabin floor (for example due to the shape of the foot-receiving furniture). The first width of the access opening is preferably measured at a first height from the cabin floor. The second width is preferably measured at the same height as the first width.

The first width may be the minimum width of the access opening. Thus, the first height may be a height at which the access opening is narrowest. The minimum width is preferably no less than 9 inches. Providing an arrangement in which the minimum width is increased (to the second width) may be beneficial because it tends to ensure what is likely to be the most problematic part of the opening (i.e. the narrowest part) is widened to allow the disabled passenger access.

When the access opening is temporarily widened from the first width to the second width, the access opening is preferably no narrower than the second width, above the first height.

The second width may be at least the width of the aisle. The second width may be substantially equal to the width of the aisle. For example, the aisle may be 20 inches wide. The second width is preferably at least 20 inches wide. The second width may be 20 inches wide.

The aisle width is typically sufficient for disabled access along the aisle (e.g. for a wheelchair), so matching the second width with the aisle width tends to ensure there will be adequate disabled access into the seat unit too. The aisle may have a minimum aisle width. The magnitude of the second width may be at least the same as the minimum aisle width. The minimum aisle width may be measured at less than 25 inches from the floor.

In some embodiments, the seat units may be arranged such that in the disabled-access configuration, there is a provided a transfer surface for transferring the passenger into the seat unit. The transfer surface may be provided by virtue of the access opening being temporarily widened from the first width to a second width. For example, in the disabled-access configuration, the transfer surface may at the first height (i.e. the height at which the opening is widened from the first width to the second width). The transfer surface may be substantially coplanar with the seat pan, preferably when the seat unit is in the seating configuration. The transfer surface may be substantially coplanar with a leg rest. Alternatively or additionally, the transfer surface may be substantially coplanar with the flat-bed surface, when the seat unit is in the flat bed configuration.

The foot-receiving structure is for receiving the feet of a passenger when the unit is in a flat-bed configuration. The foot-receiving structure may take a number of forms:

The foot-receiving structure of each seat unit may comprise a foot-supporting surface arranged to support the passenger's feet when the unit is in the flat-bed configuration. The foot-supporting surface may be substantially coplanar with the flat-bed surface when the unit is in the flat-bed configuration. The foot-supporting surface may comprise an ottoman.

The foot-receiving structure of each seat unit may comprise an end-wall arranged to shield the passenger's feet from the aisle. In embodiments comprising a foot-supporting surface, the end-wall may be located between the aisle and the foot-supporting surface. The foot-receiving structure may comprise a side wall arranged to shield the passenger's feet from the adjacent seat unit. In embodiments comprising a foot-supporting surface, the side-wall may separate the adjacent unit from the foot-supporting surface.

The foot-receiving structure may comprise an upper surface. The upper surface may form a utility surface above the passenger's feet. The utility surface may be for use by a passenger located in the adjacent seat unit. For example, the utility surface may be a table surface.

At least part of one of the structures, for example the foot-receiving structures, bordering the access opening may be moveable, so as to temporarily widen the access opening from the first width to the second width when the units are in the disabled-access configuration.

In some embodiments, the part of the foot-receiving structure may be moveable to an alternative position (e.g. retracted, or otherwise moved, to one side) to temporarily widen the access opening. In this alternative position, the part of the foot-receiving structure may remain attached to the other parts of the foot-receiving structure. The nature of the movement of the part of the foot-receiving structure may take a number of forms. For example, and without limitation: the part of the foot-receiving structure may be moveable by way of a translation; the translation may be a movement in any direction that achieves the function of widening the access opening; the translation may be achieved via a suitable mechanism such as, and without limitation, being slideably mounted on rails, or moveable via a parallelogram linkage. In some embodiments, the part of the foot-receiving structure may be moveable by way of a pivoting, rotating, hinging or folding movement; the axis of such a movement may be any orientation that rotation about the axis achieves the function of widening the access opening.

In some other embodiments, the part of the foot-receiving structure may be moveable by being detachable, so that when detached, the access opening is temporarily widened from the first width to the second width. In such embodiments, the part of the foot-receiving structure is preferably repeatedly detachable and re-attachable (for example via fasteners or latches).

In some embodiments, at least part of the end-wall of the foot-receiving structure may be moveable, so as to temporarily widen the access opening from the first width to the second width. The at least part of the end-wall that is moveable is preferably the part that borders the opening when the seat units are in the able-bodied access configuration. All of the end-wall may be so moveable.

In embodiments in which part of the structure (for example part of the foot receiving structure) is moveable, so as to temporarily widen the access opening, it will be appreciated that the moveable part is typically fixed during normal use. For example the moveable part may be fixed during substantially all use in the able-bodied configuration. The moveable part may not need to be moved to enable the access opening to be used for able-bodied access. The moveable part of the structure may be a part that is moveable only for the purposes of changing the seat unit into the disabled-access configuration.

In some embodiments, substantially all of the one of the foot-receiving structures bordering the access opening may be moveable, so as to temporarily widen the access opening from the first width to the second width. The foot-receiving structure may be rotatable to a rotated position, so as to temporarily widen the access opening from the first width to the second width when the units are in the disabled-access configuration. The foot-receiving structure may be translatable to a translated position, so as to temporarily widen the access opening from the first width to the second width when the units are in the disabled-access configuration.

The upper-surface of the foot-receiving structure may be moveable, so as to temporarily widen the access opening from the first width to the second width when the units are in the disabled-access configuration. The upper surface may be moveable to a lowered position. In the lowered position the upper surface may be arranged as a transfer surface for transferring the passenger into the seat unit. The transfer surface may be substantially coplanar with a seating element, such as the seat pan, to create a transfer surface over which the disabled passenger may move, to access the seating element, such as the seat pan.

In some embodiments, the foot-receiving structure may comprise only one of the above-mentioned features. It will be appreciated that in some other embodiments the foot-receiving structure may comprise a plurality of the above-mentioned features in combination.

Each seat unit may comprises a monitor. The monitor may be an in-flight entertainment (IFE) monitor. The monitor may be configurable between a stowed position (for example for taxi, take-off and landing—TTOL) and an in-use position (for viewing by the passenger). The monitor may be further configurable to an access position for facilitating access to the seat unit. In the access position the monitor may be in a different position to the stowed position and the in-use position. The monitor may be deployed from the stowed position to the in-use position in a first direction. The monitor may be moveable from the stowed position to the access position in a second direction, opposite to the first direction. For example the first and second directions may be rotations in opposite directions about a common pivot.

In the access position, the spacing above the access opening, between adjacent monitors is widened, relative to the stowed configuration. The monitor may be in the access position when the seat unit is in the disabled-access configuration.

In the disabled-access configuration, at least one of the seating elements may be moved, relative to its position in the seating configuration, into a location in proximity to the access opening. The location in proximity to the access opening may be suitable for transferring the disabled passenger onto the seating element, via the access opening. The seating element may be the seat pan. The seating element may be a leg rest. In some embodiments, in the disabled-access configuration, the seat pan may be moved forward, relative to the position in the seating configuration, into the location in proximity to the access opening. The location in proximity to the access opening may be sufficient for a disabled passenger to move onto the seat pan via the access opening. The seat pan may be moved forward as a result of forward movement of the seat (i.e. along the central axis of the seat unit). For example the seat may be slideably moveable in the forwards direction. In some embodiments the seat pan may be moved forward as a result of the seat unit switching from the seating configuration to the flat-bed configuration. Thus, in such embodiments, in the disabled-access configuration, the seat unit may be moved into the flat-bed configuration.

Embodiments have been found to be especially beneficial for use on relatively high angle/low pitch layouts. The acute angle at which the seating elements are orientated to the longitudinal direction may be at least 45 degrees. The acute angle at which the seating elements are orientated to the longitudinal direction may be between 47 and 51 degrees. The acute angle at which the seating elements are orientated to the longitudinal direction may be between 48 and 50 degrees. The acute angle at which the seating elements are orientated to the longitudinal direction may be substantially equal to 49 degrees.

The pitch between consecutive seat units in the column may be less than 33 inches. It will be appreciated that the pitch is defined as the distance, along the longitudinal direction, between two corresponding common points on adjacent seat units. The pitch between consecutive seat units in the column may be less than 32 inches. The pitch between consecutive seat units in the column may be less than 31 inches. The pitch between consecutive seat units in the column may be less than 30 inches. The pitch between consecutive seat units in the column may be between 24 and 33 inches. The pitch between consecutive seat units in the column may be between 24 and 30 inches. The pitch between consecutive seat units in the column may be between 25 and 29 inches. The pitch between consecutive seat units in the column may be between 27 and 29 inches. The pitch between consecutive seat units in the column may be substantially equal to 28 inches.

In the flat-bed configuration, the bed length may be at least 75 inches. In the flat-bed configuration, the bed length may be between 77 and 78 inches.

Embodiments have been found to be especially beneficial for use on narrow body aircraft. The column of seat units may be adjacent the aisle on one side, and adjacent the aircraft sidewall on the other side. The cabin may comprise a second column of seat units on the opposite side of the aisle, the second column being arranged as described with reference to the first column. The aisle may extend along the centre line of the cabin. The second column may be adjacent the aisle on one side, and adjacent the aircraft sidewall on the other side. Thus, the seating arrangement may be on a single-aisle aircraft.

In some embodiments, there is provided a multiplicity of seat units for forming the passenger seating arrangement described herein.

In some embodiments, there is provided a seat unit for use as one of the seat units in the passenger seating arrangement described herein.

In some embodiments, there is provided a method of providing access, for a disabled passenger, to a seat unit in a passenger seating arrangement, the passenger seating arrangement comprising a multiplicity of seat units, each having a respective access opening having a first width for access by an able-bodied passenger. The method comprises the step of: temporarily configuring a seat unit into a disabled-access configuration in which an access opening is widened from the first width to a second width, greater than the first width, for enabling a disabled passenger to access the seat unit.

In some embodiments, there is provided a passenger seating arrangement in an aircraft cabin, the passenger seating arrangement comprising a column of seat units arranged in an inwardly facing herringbone. Each seat unit is configurable between a seating configuration and a flat-bed configuration. Each seat unit has an access opening for accessing the respective seat unit. At least one of the seat unit is configurable into a disabled-access configuration in which an access opening is temporarily widened, for enabling a disabled passenger to access the seat unit. Each seat unit may comprise an end-wall partially enclosing an ottoman. In the disabled-access configuration the end-wall may be temporarily moved to an access position thereby widening the access opening to allow disabled passenger access to the seat unit. The seat units are in a high angle/low pitch herringbone, for use on a single aisle aircraft.

In some embodiments there is provided a structure for bordering an access opening to a seat unit as described herein. At least part of the structure is moveable, so as to temporarily widen the access opening from a first width to a second width. The structure may be a foot-receiving structure for receiving the feet of a passenger when the seat unit is in a flat-bed configuration. The foot-receiving structure may comprise an end-wall arranged to shield the passenger's feet from the aisle. At least part of the end-wall may be moveable, so as to temporarily widen the access opening from the first width to the second width.

It will of course be appreciated that features described in relation to some embodiments may be incorporated into other embodiments. For example, the method of an embodiment may incorporate any of the features described with reference to apparatuses of other embodiments and vice versa. Features from a seating arrangement according to one aspect, may be incorporated into the seating arrangement according to another aspect and vice versa.

DESCRIPTION OF THE DRAWINGS

Embodiments of the present invention will now be described by way of example only with reference to the accompanying schematic drawings of which:

FIGS. 1a to 1d show part of a column of seat units in an arrangement according to a first embodiment, one of the seat units being shown as it changes into the disabled-access configuration;

FIGS. 2a to 2c show part of a column of seat units in an arrangement according to a second embodiment, one of the seat units being shown as it changes into the disabled-access configuration;

FIGS. 5a to 5e show part of a column of seat units in an arrangement according to a fifth embodiment, one of the seat units being shown as it changes into the disabled-access configuration;

DETAILED DESCRIPTION

Figure 1A:
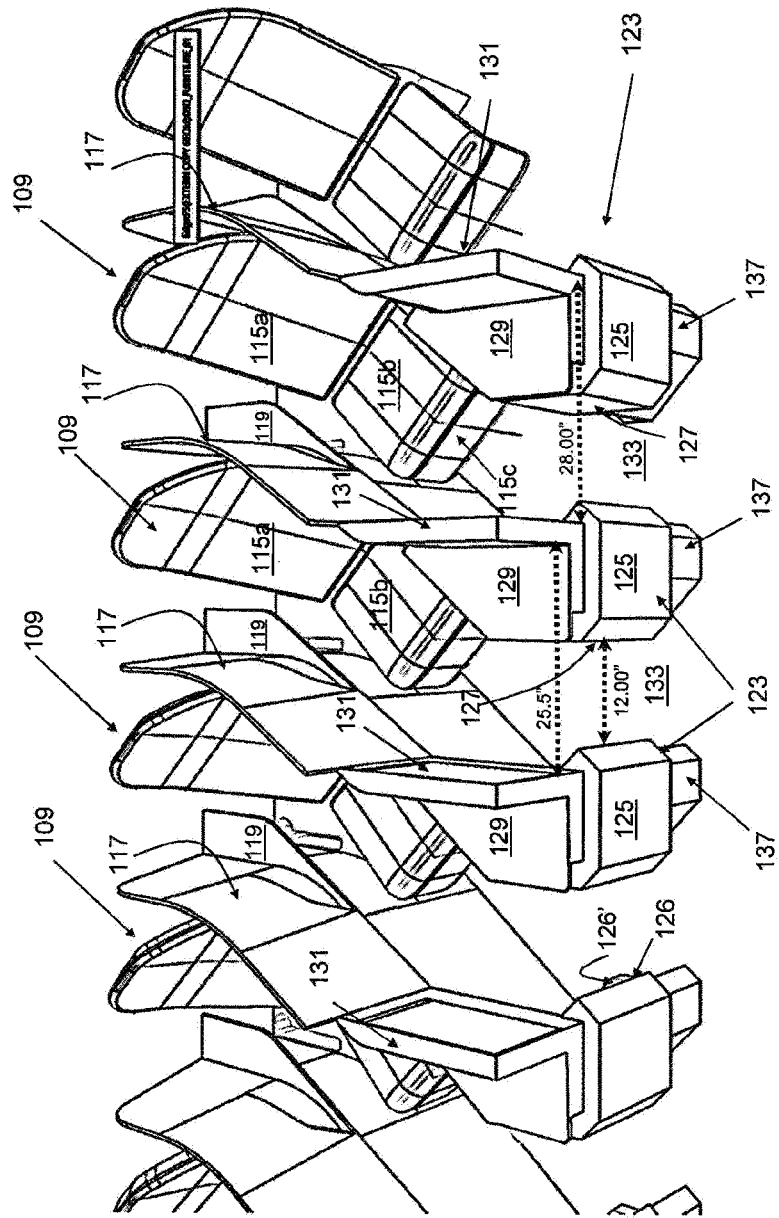

FIGS. 1a to 1d show part of a column of seat units in an arrangement according to a first embodiment. FIG. 1e shows a cabin in an aircraft in which the column of seat units of FIGS. 1a-1e is installed.

Referring first to FIG. 1e, the passenger seating arrangement 101 of the first embodiment is located in an aircraft cabin 103 of a narrow body aircraft 105 such as a Boeing 757-200, or 737-900. The passenger seating arrangement 101 comprises a column 107 of seat units 109 (described in more detail with reference to FIGS. 1a-1d) located adjacent a single aisle 111 running along the centre of the aircraft cabin. The column 107 of seat units and the aisle 111 both extend in a longitudinal direction (L) parallel to the longitudinal axis 113 of the aircraft cabin.

The column 107 comprises a multiplicity of seat units 109, arranged consecutively along the longitudinal direction. A second column 107' is located the other side of the aisle and is substantially symmetrical with the first column, across the axis 113. Features described herein tend to be described with reference to the first column 107, but it will be appreciated that corresponding features are also found in the other column 107' of seat units.

Referring now to FIG. 1a, each seat unit 109 comprises a plurality of moveable seating elements in the form of a seat back 115a, seat pan 115b, and leg rest 115c. To one side of the seating elements is a curved screen 117 arranged to separate a passenger in an aft seat unit in the column from a passenger in a fore seat unit in front of it in the column. Armrest surfaces 119 extend along both internal edges of the unit for use by a passenger in the seat (only the passenger's right-hand armrest is visible in these figures).

Figure 5B:
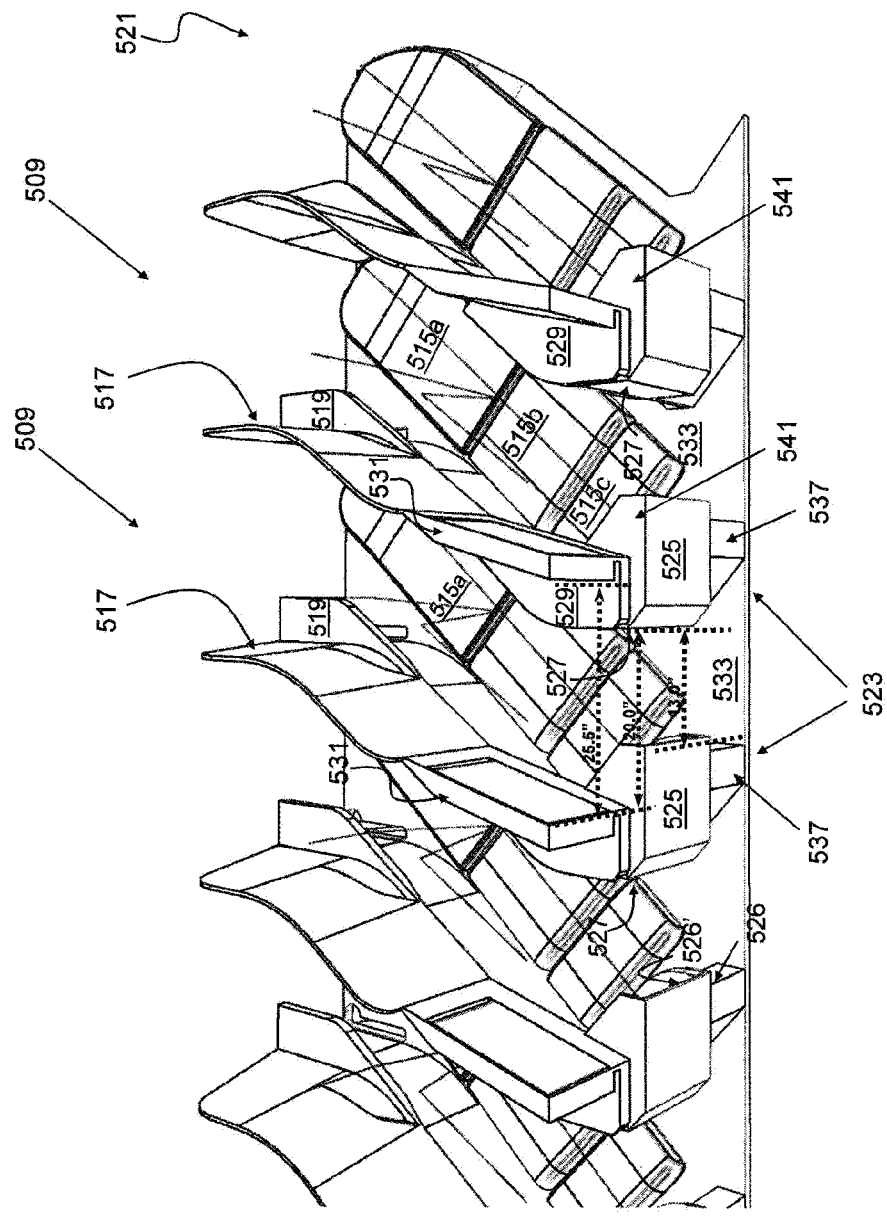
Figure 5C:
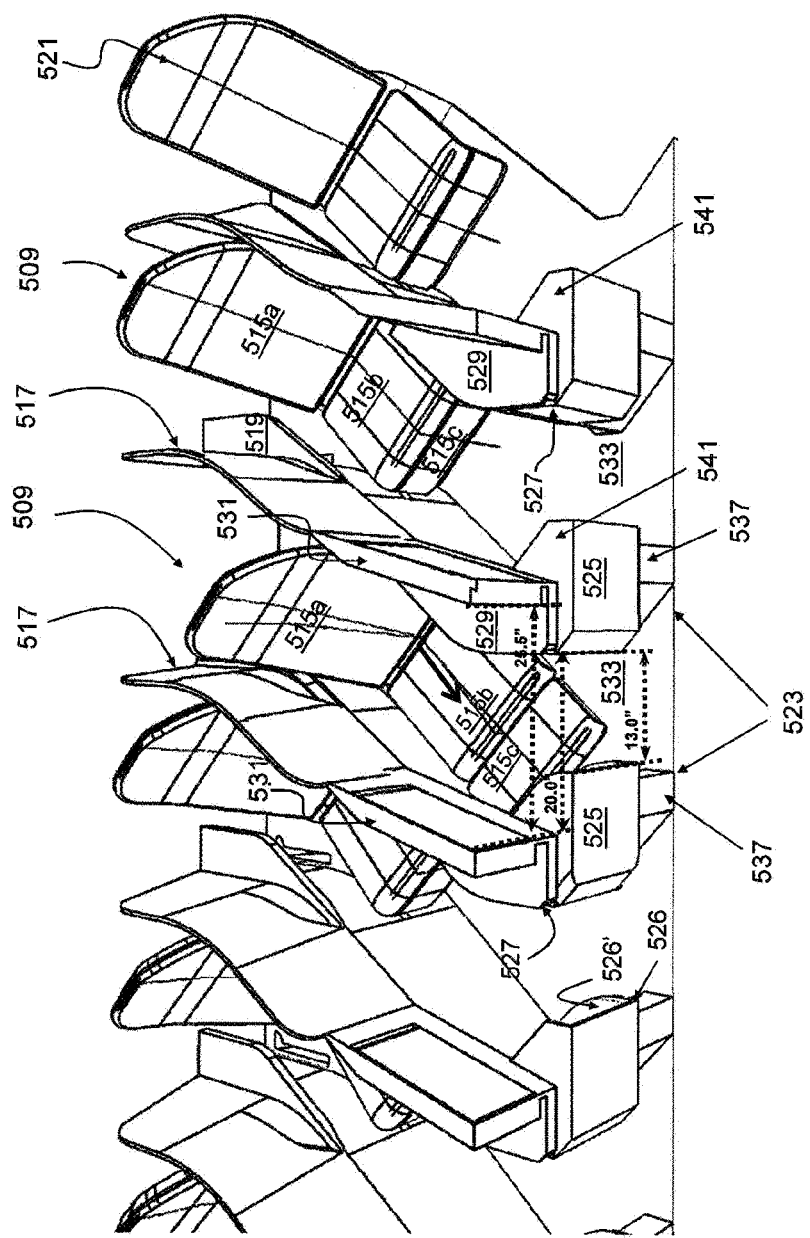

FIG. 1a shows the seat units in a seating configuration in which the seating elements are arranged to form a seat in which the passenger may sit. Each seat unit is also configurable into a flat-bed configuration in which the seating elements are arranged to form a substantially co-planar surface for a flat-bed (the difference between the seat configuration and the bed configuration is illustrated herein with reference to the embodiment in FIGS. 5a and 5b; FIG. 5b showing the seats in the bed configuration). Seat units that are convertible to flat-beds are known per se, and the precise manner in which the seating elements are rearranged to form the bed (e.g. the recline/convert mechanism) need not be described further in the context of the present invention.

In each seat unit, the seating elements are orientated at an angle of 49 degrees to the longitudinal direction (L) and face inwardly towards the aisle (see FIG. 1e). The angle is measured between the central axis 121 of each seat (that central axis 121 extends through the centre of the seat pan and back rest and is shown schematically bisecting the seats in FIG. 1a-1e). Such an arrangement is typically referred to as an inwardly facing herringbone. In the first embodiment, the herringbone is at a relatively large (steep) angle and correspondingly the pitch between consecutive seat units is relatively small; as illustrated in FIG. 1a the pitch in the first embodiment is 28 inches).

Each seat unit 109 comprises a foot-receiving structure 123 for receiving the feet of a passenger when the unit is in a flat-bed configuration. The foot-receiving structure comprises an end-wall 125 and a side wall 127 for shielding the passenger's feet from the aisle 111 and the adjacent seat unit respectively. The end-wall and side walls 125, 127 partially enclose an ottoman 126 (only partially visible in the leftmost seat unit 109 in FIGS. 1a-1d). The ottoman 126 has a foot-supporting surface 126' which is coplanar with the seating elements when the unit 109 is in the bed configuration and the foot-supporting surface forms part of the bed surface.

Above the end and side walls 125, 127, and above the ottoman 126 is a flat table surface 129 which is for use by a passenger in the adjacent seat unit. Directly beneath the table surface 129 is a horizontal slot 130 (see FIG. 1d) for receiving a pull-out table (not shown).

An IFE monitor 131, when in a stowed position for TTOL, extends along one side of that table. The monitor 131 is attached by a hinge to the end of the curved screen 117, and can move from this stowed position, into an in-use position (not shown) in which it faces the passenger.

The spacing between the foot-receiving structure 123 of a seat unit 109 and the foot-receiving structure 123 of a seat unit 109 to one side of it in the column 107, defines an access opening 133 into the seat unit 109.

In a default configuration, the seat units are configured for able-bodied access, and this configuration is shown in FIG. 1a. In this configuration, the access opening has different widths at different heights: The minimum width of the opening is 12 inches, created between the end-wall 125 of the foot-receiving structure of one seat unit and the side wall 127 of the foot-receiving structure of an aft seat unit behind it in the column. This minimum width is at between 10 and 25 inches from the cabin floor. Below the level of the end and side walls is the base 137 of the foot-receiving structure, which is located within the footprint of the end and side walls. The width between adjacent bases is therefore wider than the 12 inch width above them. Above the level of the table surface, there is a gap of 25.5 inches (created between the adjacent monitors 131)—the gaps/widths being shown in the Figures by way of dotted-lines.

Figure 1B:
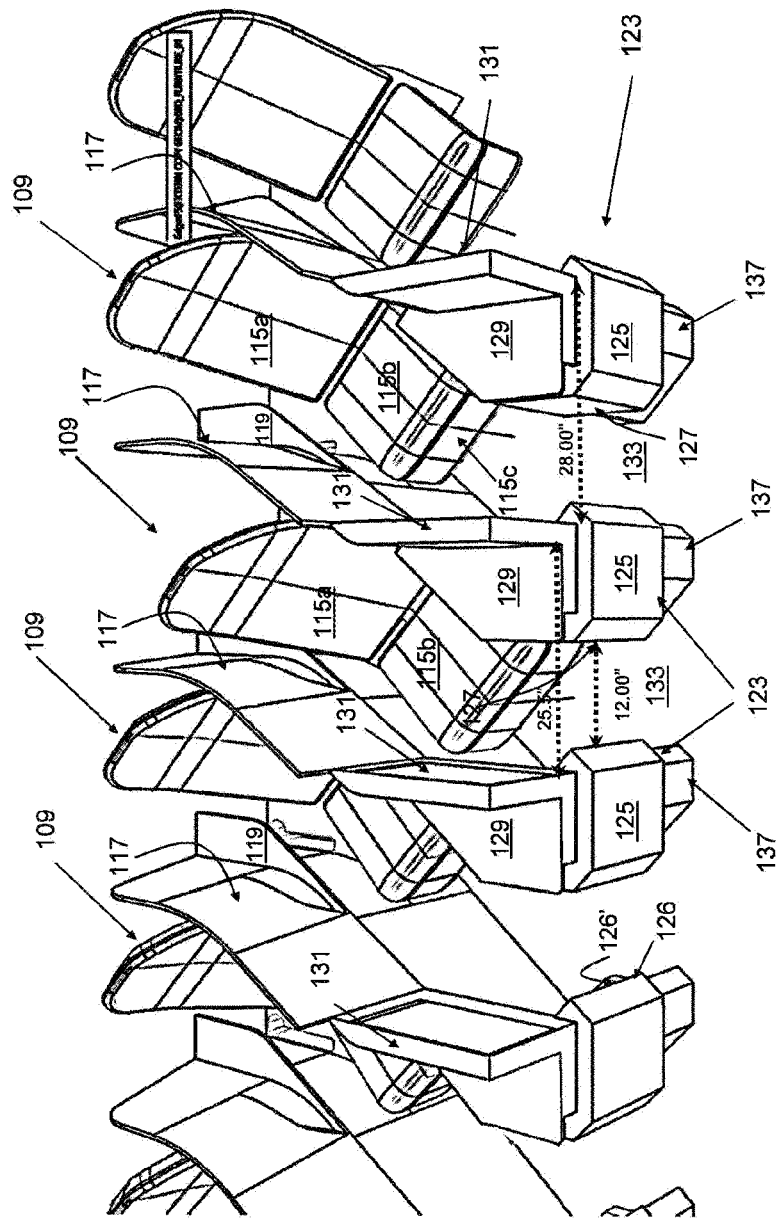
Figure 1C:
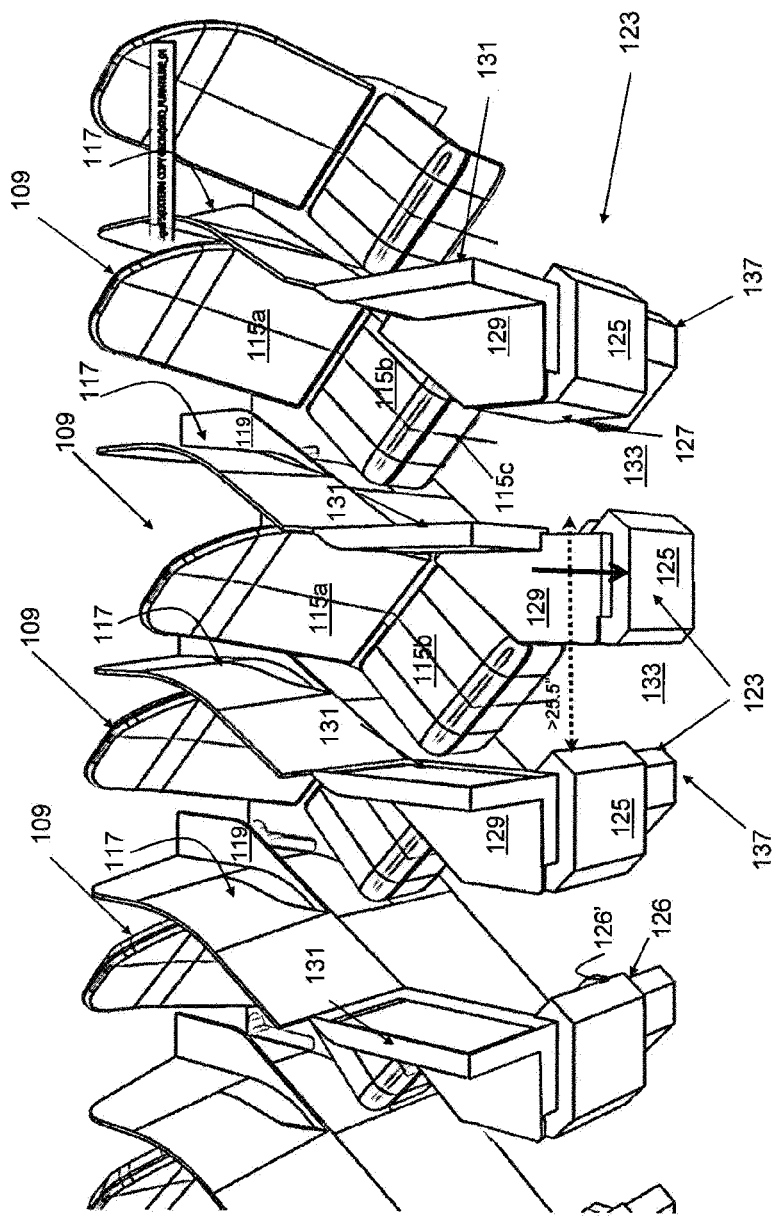
Figure 1E:
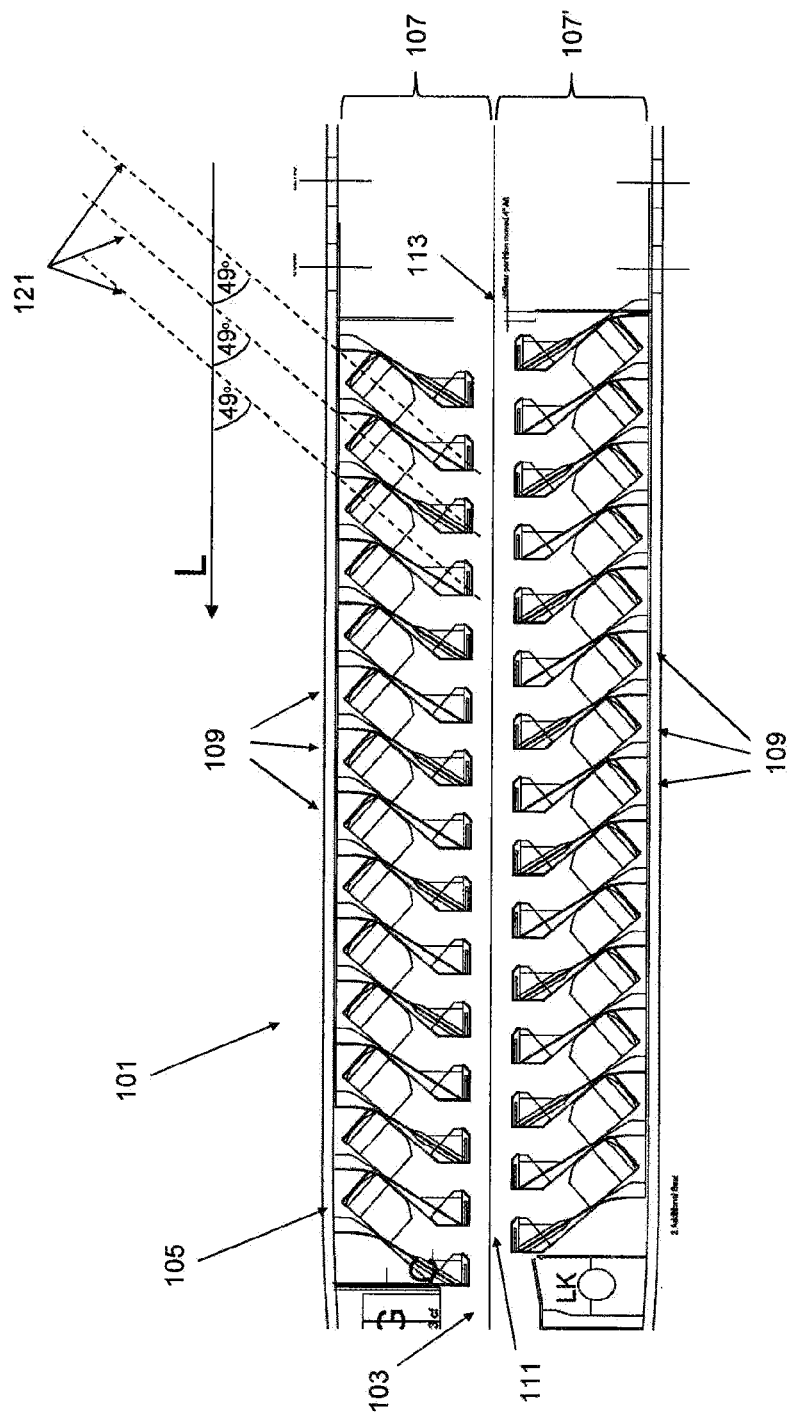
FIG. 1e shows a cabin in an aircraft in which the column of seat units of FIGS. 1a-1e is installed.

Whilst this access opening is perfectly useable for an able-bodied passenger, it tends to not be useable for disabled passenger access. For example, it is not thought to be possible for crew to assist a disabled passenger through this opening in a dignified manner. To address this problem, a first embodiment provides an arrangement in which a seat unit can be configured into a disabled-access configuration in which the access opening is temporarily widened to allow disabled passenger access. The switch into the disabled-access configuration is now described with reference to FIGS. 1b to 1e:

Referring first to FIG. 1b, the first step is to translate the seat (seat back, pan and leg rest) of the seat unit 109 to which access is required, forward 12 inches along the central axis 121 (e.g., toward the aisle), so that the seat pan is in proximity to the opening 133.

Next, the structure enclosing the ottoman 126 (namely the end-wall 125, the side wall 127 and the table 129) is lowered to the aisle floor (see, e.g., FIG. 1d). By virtue of the base 137 being of smaller footprint, this structure can envelop the base 137.

The lowering of this structure has two effects. Firstly, the width of the opening, above a height of 17.5 from the cabin floor, is widened from 12 inches to around 25.5 inches. Secondly, the table surface 129, once lowered, is substantially coplanar with, and abuts, the seat pan 115b. The table surface 129 can therefore be used as a transfer surface for transferring a disabled passenger. For example, the disabled passenger may use the table surface to slide from the aisle 111 onto the seat pan 115b. This manoeuvre is also facilitated by the width of the opening, above the height of the lowered table, having been widened from 12 inches to over 25.5 inches.

Once the passenger has access to the seat unit, the above-mentioned steps can be carried out in reverse, to return the seat unit to its default configuration. Should the passenger wish to exit the seat unit, the process can, of course, be repeated as required for the necessary egress.

In the first embodiment, two adjacent seat units undergo changes between the able-bodied access configuration and the disabled access configuration. The seating elements of the seat unit to which access is required are moved, and the foot-receiving structure of the aft seat unit is lowered. In this context, it will be appreciated that two of the seat units are configurable into a disabled-access configuration for enabling a disabled passenger to access one of those two seat units.

Although the first embodiment has been described with reference to disabled access being required to only one of the seat units, the seating arrangement in FIGS. 1a-1e in fact comprises a multiplicity of substantially identical seat units, such that any and all of them can be configured into the disabled access configuration. Such an arrangement is attractive as it may enable free choice of seat for disabled passengers, and may simplify construction of the seat units because all of them are substantially identical.

In other embodiments (not shown) it may be that only some, for example 50%, of the seat units, within the multiplicity of seat units, are configurable to allow disabled access.

FIGS. 2a to 6d illustrate further embodiments. It will be appreciated that features in these embodiments can be assumed to be substantially similar to those corresponding features in the first embodiment unless otherwise described. Like features are annotated with like reference numerals, but incremented by 100, 200 etc. appropriate depending on the embodiment. Unless otherwise stated, in all these embodiments the seat units are arranged in a single-aisle aircraft cabin in an inwardly facing herringbone layout (i.e. in general terms as per the layout in FIG. 1e). In the interests of clarity, not all reference numerals are shown in the Figures for all the seat units.

Figure 2B:
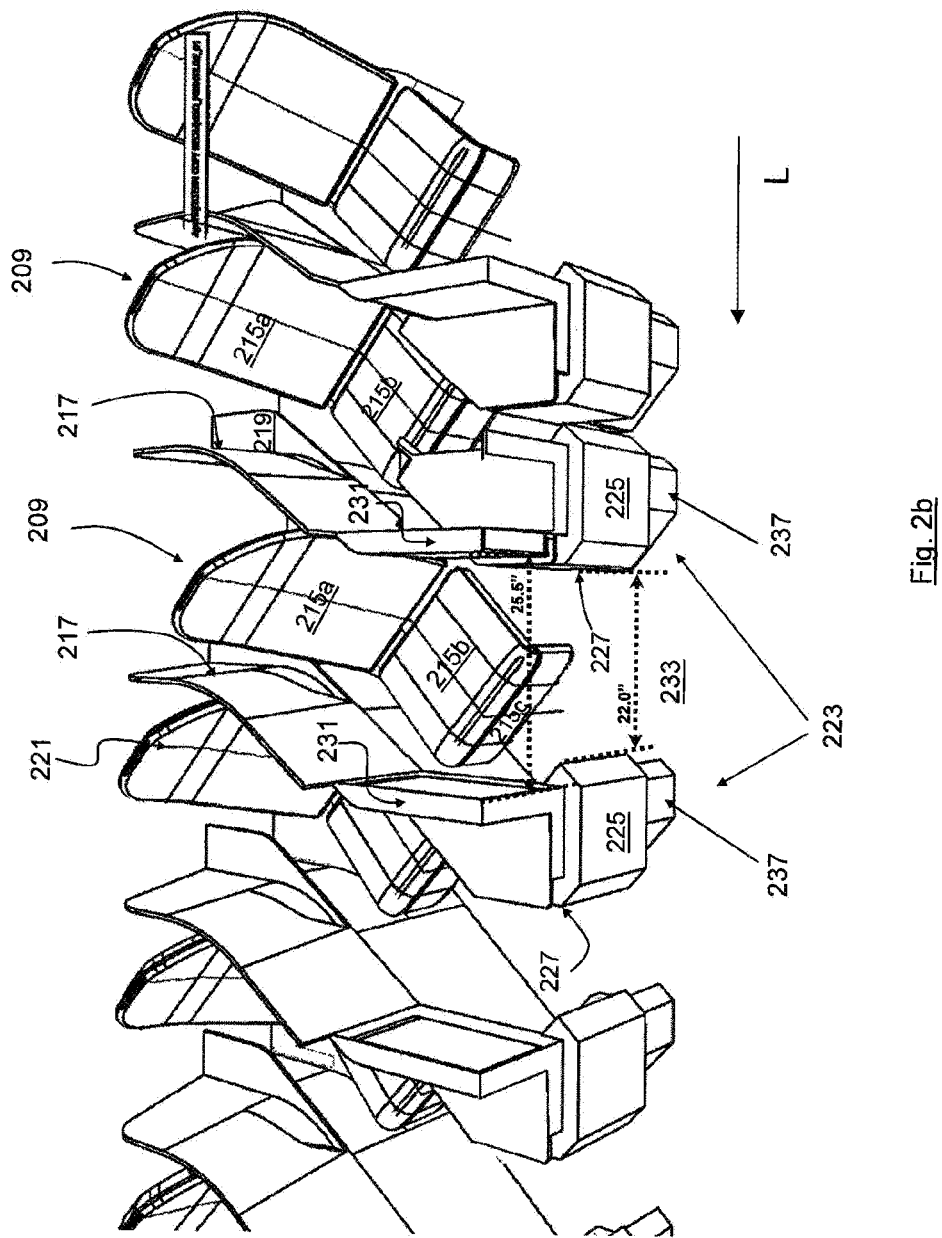
Figure 2C:
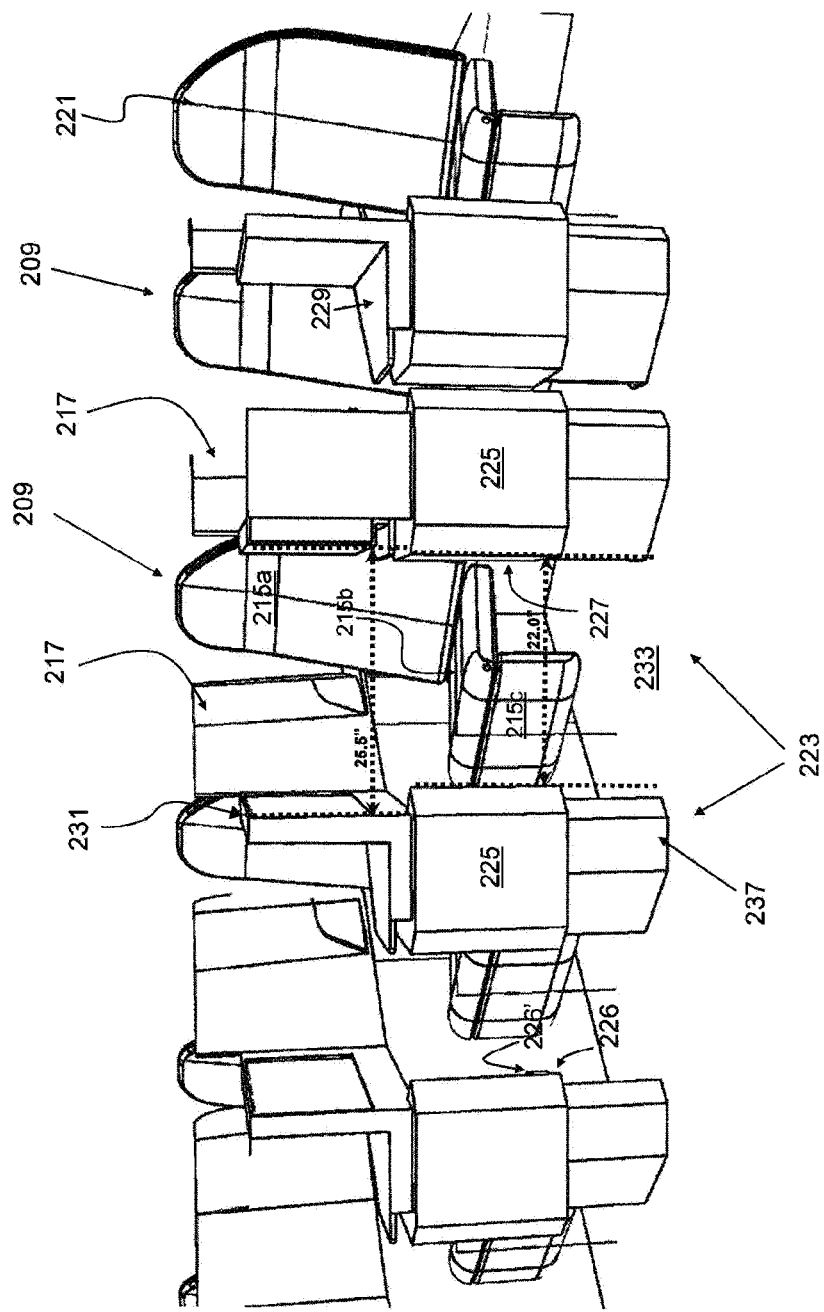

FIGS. 2a-2c show part of a passenger seating arrangement according to a second embodiment. In the able-bodied access configuration the layout looks largely identical to that of FIG. 1a, except that there is an optional additional aisle screen 235 between the table surface 229 and the aisle. To move to the disabled-access configuration, the seat (seating elements 215a,b,c) is translated forward to the position shown in FIG. 2a. Next, the screen 235 is removed (shown removed on all seats in FIG. 2b, but need only be removed from one of them for these purposes). Then (and in contrast to the first embodiment) the whole of the foot-receiving structure 223 is translated rearward, by 10 inches, parallel to the longitudinal direction L (see FIG. 2b).

As a result of this translation, the 12 inch width of the access opening 233 is widened to 22 inches. The opening 233 is still defined between the same structures 223 but because one is translated aft, the width of the opening is increased. Since the access opening is now 22 inches wide, it is slightly wider than the useable width of the aisle 211 (which is 20 inches in this embodiment). Since the aisle width is sufficient for disabled access along the aisle (e.g. for a wheelchair), there can be confidence that the width of the access opening 233 is also suitable for disabled access into the seat unit 209. In the second embodiment, it is not necessary to provide a transfer surface because the increased width of the opening enables the passenger to move directly onto the seat pan 215b (which has been translated into proximity to the opening 233).

Figure 3A:
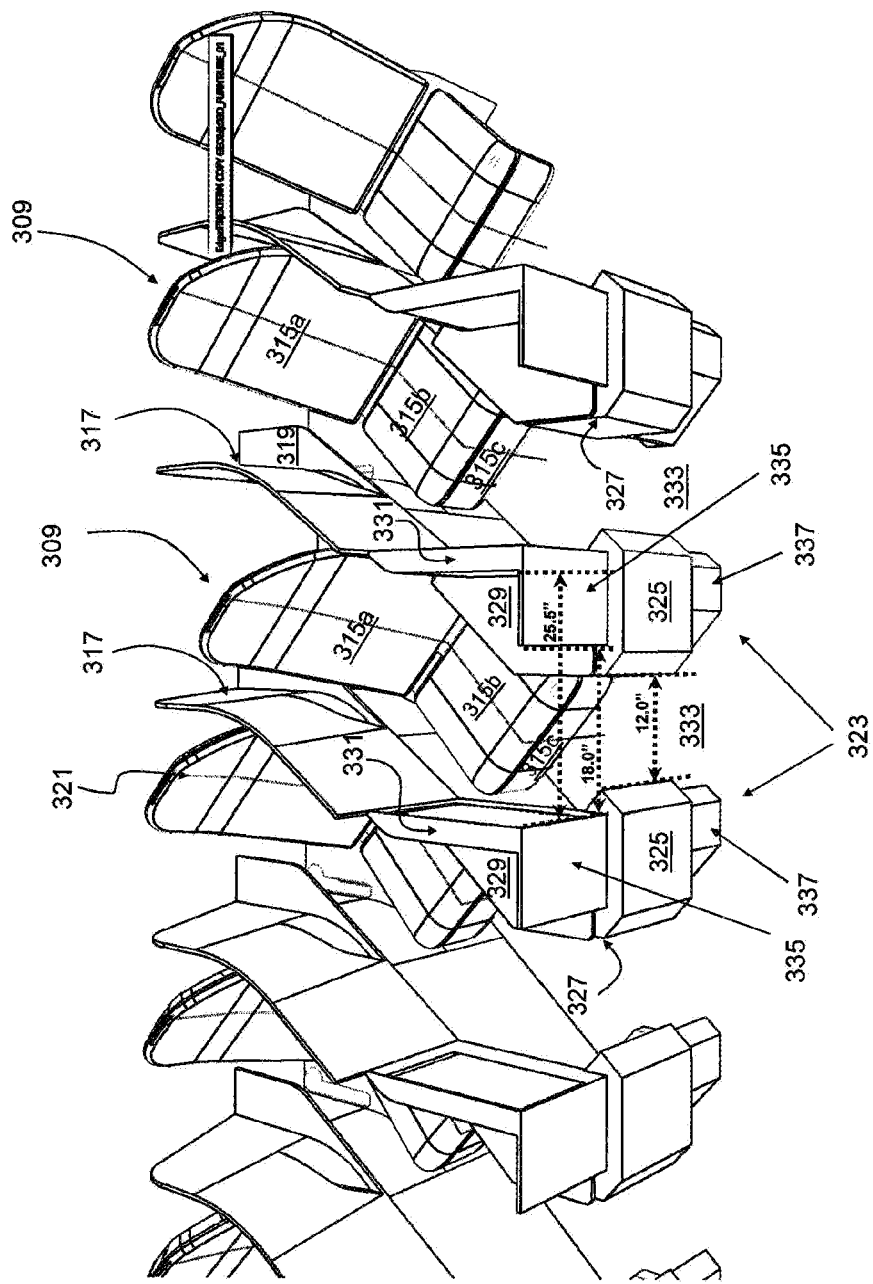
FIGS. 3a to 3c show part of a column of seat units in an arrangement according to a third embodiment, one of the seat units being shown as it changes into the disabled-access configuration.
Figure 3B:
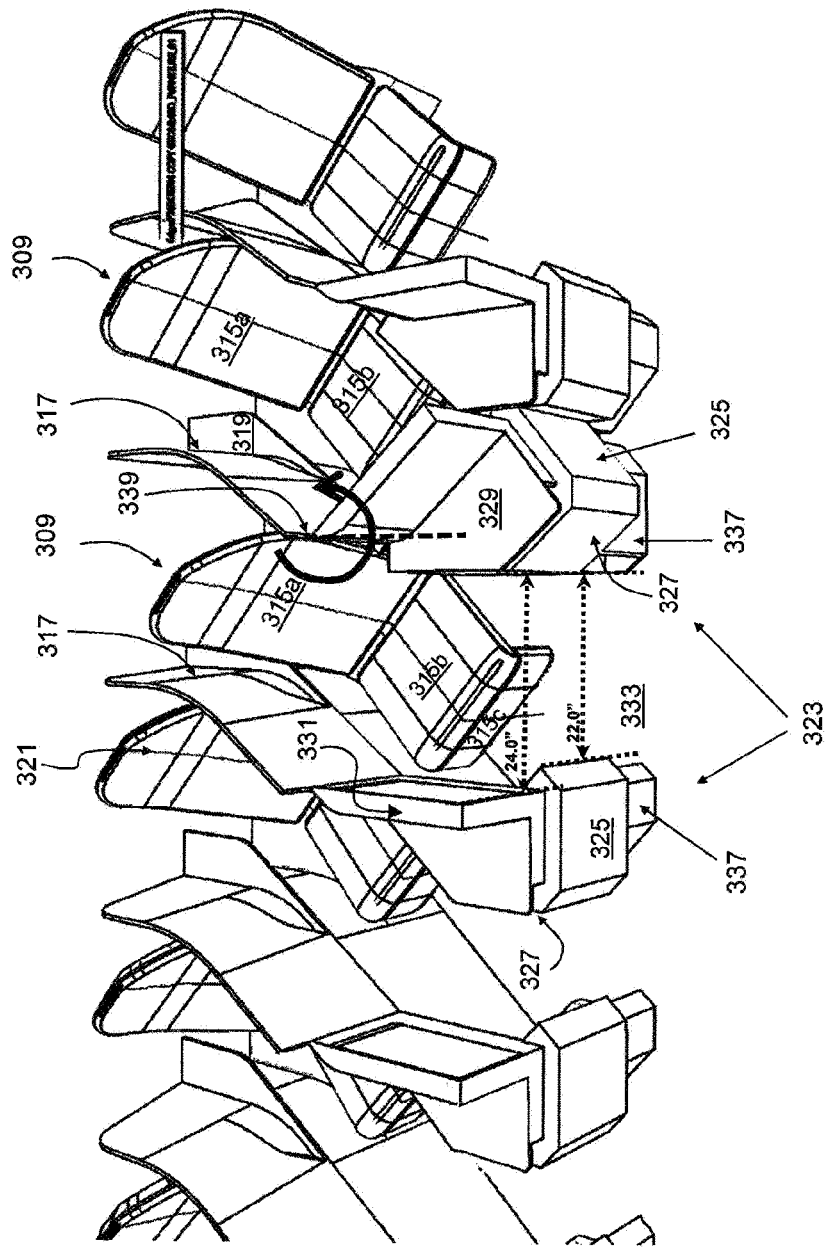
Figure 3C:
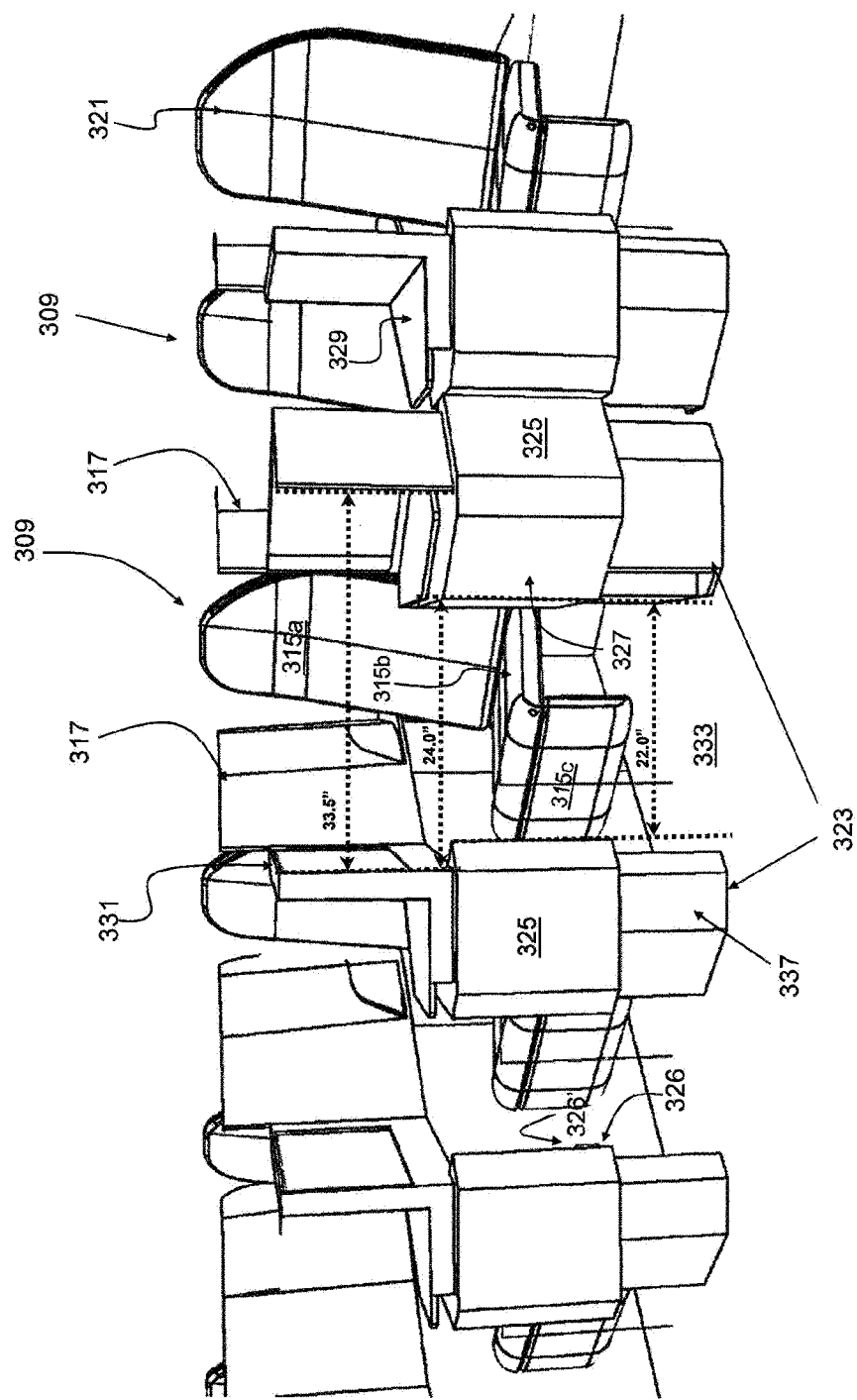

A third embodiment is shown in FIGS. 3a to 3c. This embodiment is similar to the second embodiment except that instead of translating the foot-receiving structure 323 aft, it is instead rotated about a vertical hinge 339 that is coaxial and coupled to the monitor hinge. This rotation widens the minimum width of the opening 333 from 12 inches to 22 inches. As a result of the monitor 331 also rotating with the foot-receiving structure 323 (as opposed to remaining stationary as per the second embodiment) the gap above the height of the table 329 is especially generous (33.5 inches), which may be advantageous. The presence of the screen 335 is optional and can be included or not (hence the screen is shown in some images and not others).

Figure 4A:
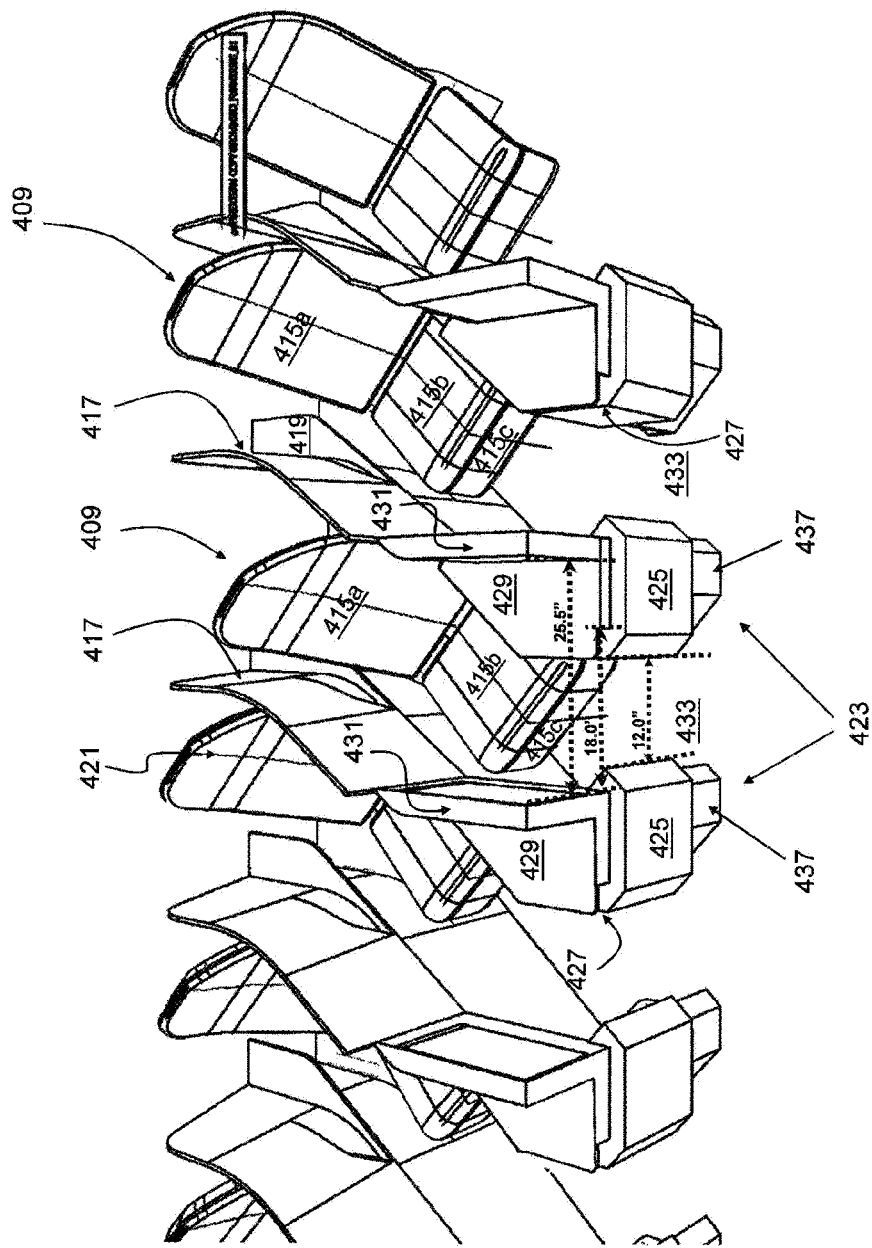
FIGS. 4a to 4c show part of a column of seat units in an arrangement according to a fourth embodiment, one of the seat units being shown as it changes into the disabled-access configuration.
Figure 4B:
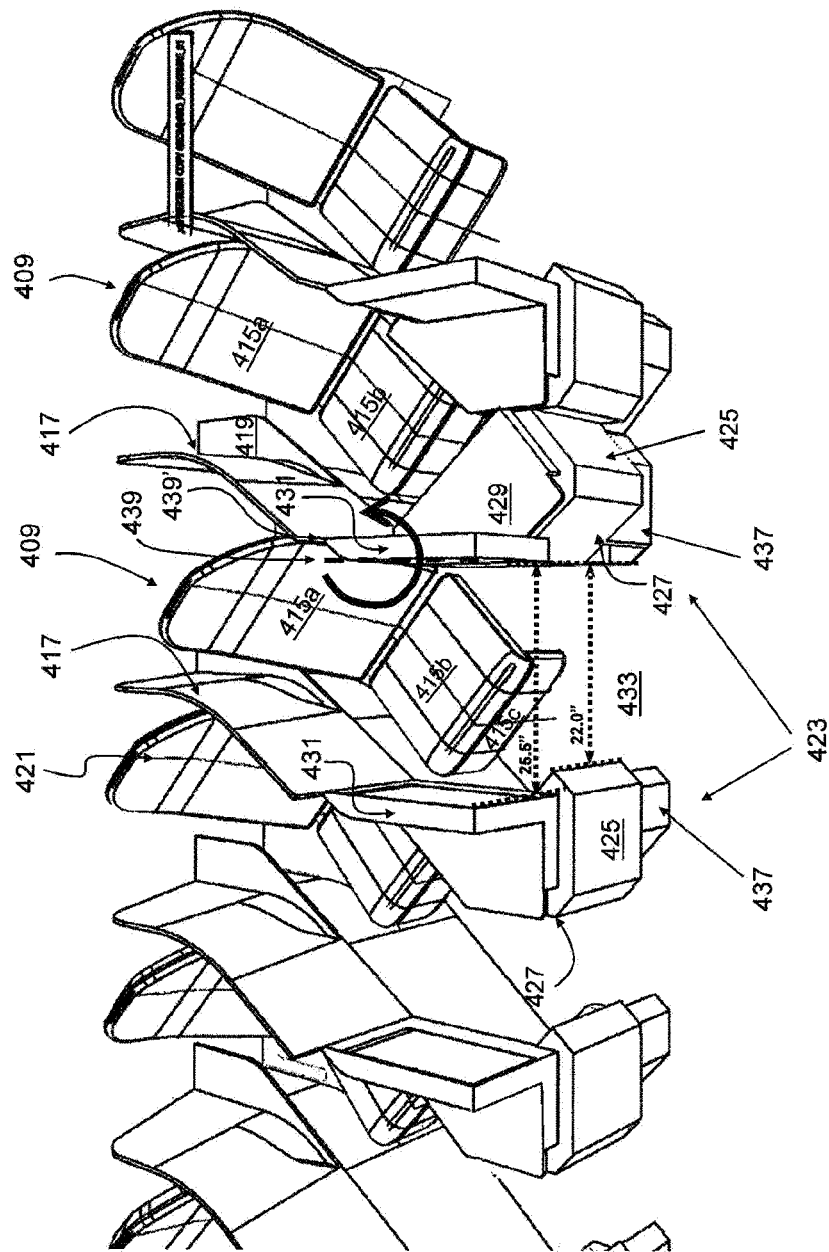
Figure 4C:
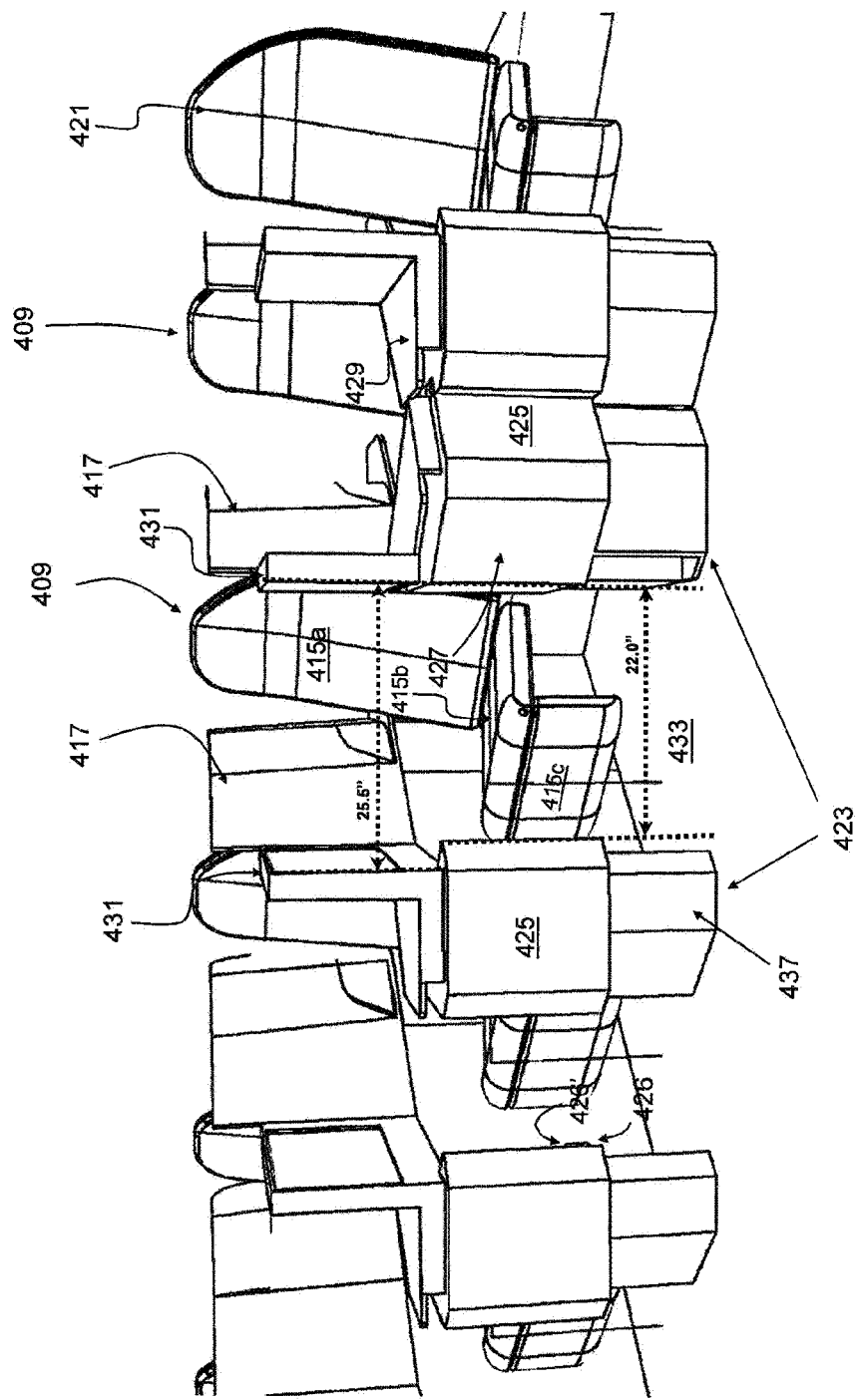

Another embodiment is shown in FIGS. 4a to 4c, which is similar to the third embodiment except that the monitor hinge 439 is decoupled from the hinge 439' for the foot-receiving structure 423. There are also no screen between the table surface and the aisle. When the foot-receiving structure 423 is rotated aft, the monitor 431 remains in its stowed position. This does not impinge on the width of the access opening 433 being widened to 22 inches, but it does result in a slightly narrower gap above the table surface 429 (compared to the third embodiment). An advantage with this arrangement may, however, be realised in terms of structural simplicity by not needing to integrate the movement of the monitor 431 into the disabled configuration.

FIGS. 5a to 5e show a fifth embodiment. In this example, the monitors 531 are stowed at a slightly swept-back angle. This slightly reduces the useable surface of the table surface 529 for the passenger in the fore seat unit 509 in the column (albeit does correspondingly expose a small surface portion 541 above the ottoman 526 for use by the passenger in the seat unit 509). In the fifth embodiment, the minimum width between the adjacent foot-receiving structures 523 is 13 inches. This minimum width extends all the way along the height of the end and side walls 525, 527.

To move to the disabled configuration, the seating elements 515a, b, c are first not only translated forward along the central axis 521, but the leg rest 515c is also deployed such that it is coplanar with the seat pan 515b and with the foot-supporting surface 526' of the ottoman 526. Thus, both the seat pan 515b and the leg rest 515c are in proximity to the access opening 533 (see FIG. 5b). Next, the access opening 533 is widened by removing the end-wall 525 from the foot-receiving structure 523 of the seat unit 109 to which access is required (see, e.g., FIG. 5d).

Figure 5E:
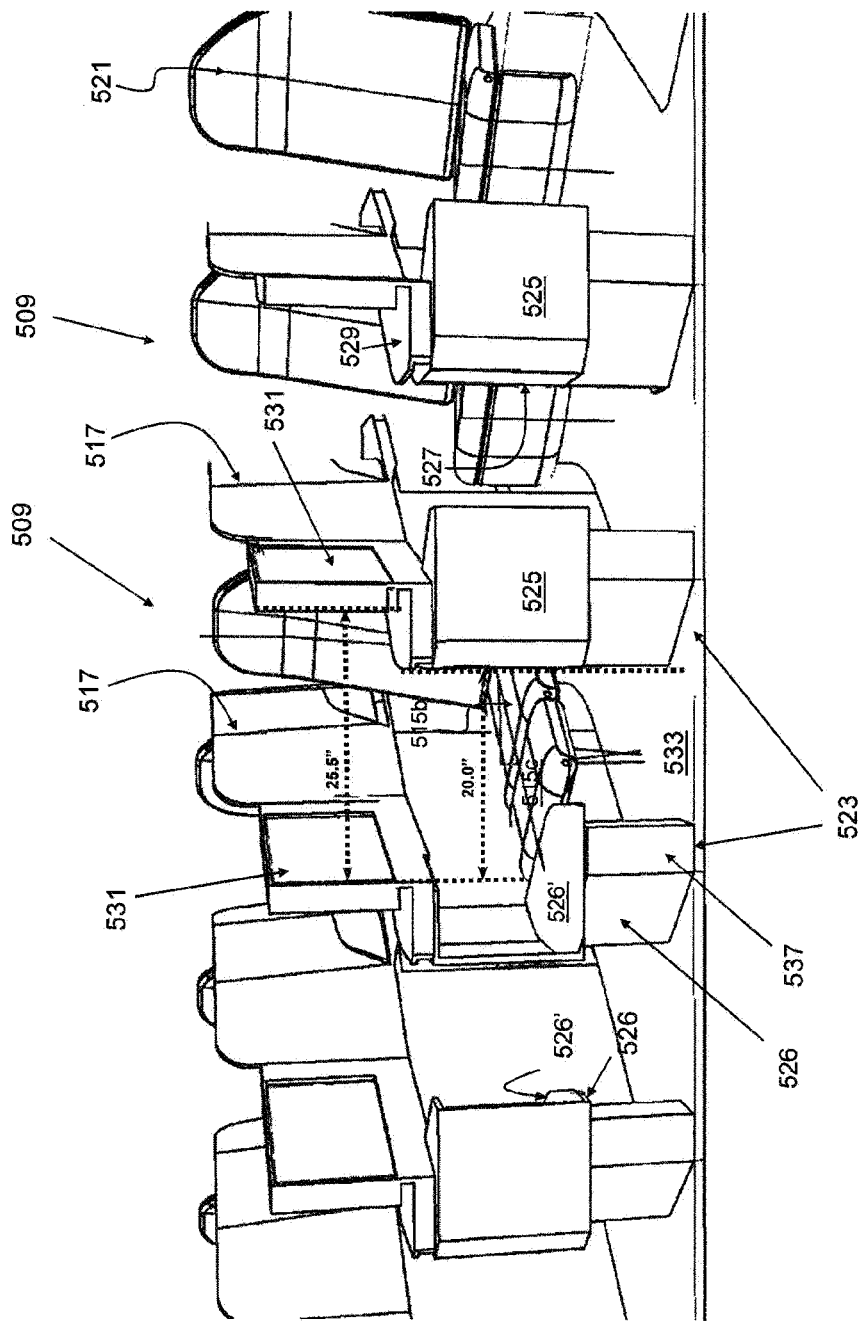

As illustrated in FIGS. 5d and 5e, the removal of the end-wall 525 widens the access opening 533 (at a height above the foot-supporting surface 526' of the ottoman 526) to at least 20 inches. In this disabled-access configuration, a disabled passenger may access the seat unit 509 by moving from the aisle 511 onto the foot-supporting surface 526' and/or the leg rest 515c and seat pan 515b without being restricted by the presence of the end-wall 525 and its associated limitation on the width of the opening 533.

After the passenger has accessed the seat unit 509, the end-wall 525 can be reattached to the remainder of the foot-receiving structure 523 and the seat can be placed back into the seating configuration (or flat-bed configuration) as required. The reverse steps can be undertaken as and when egress is required.

The fifth embodiment may be especially advantageous because the configuration into the disabled-access configuration has minimal impact on adjacent passengers (for example it does not necessitate any movement of parts of their seat unit, or otherwise impact on their personal space).

Figure 6A:
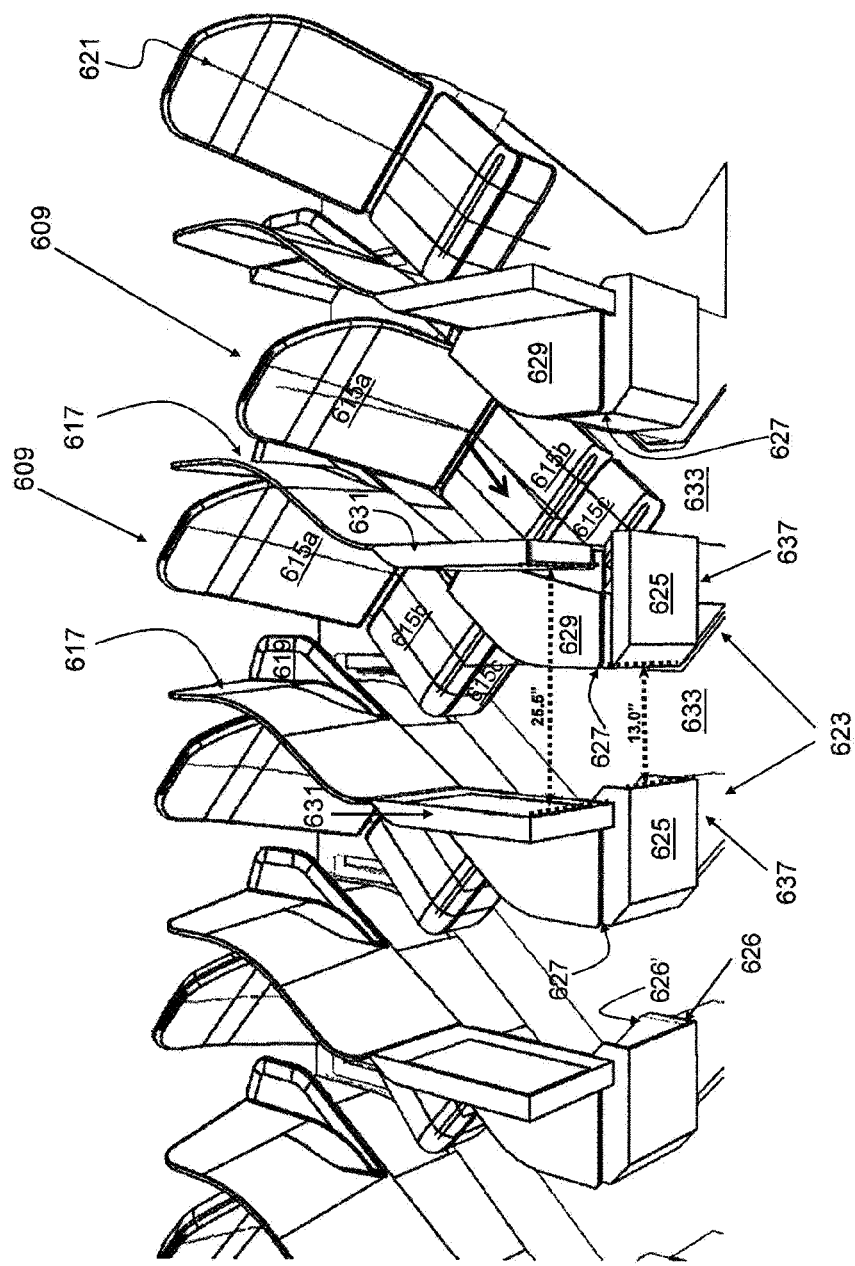
FIGS. 6a to 6d show part of a column of seat units in an arrangement according to a sixth embodiment, one of the seat units being shown as it changes into the disabled-access configuration.
Figure 6B:
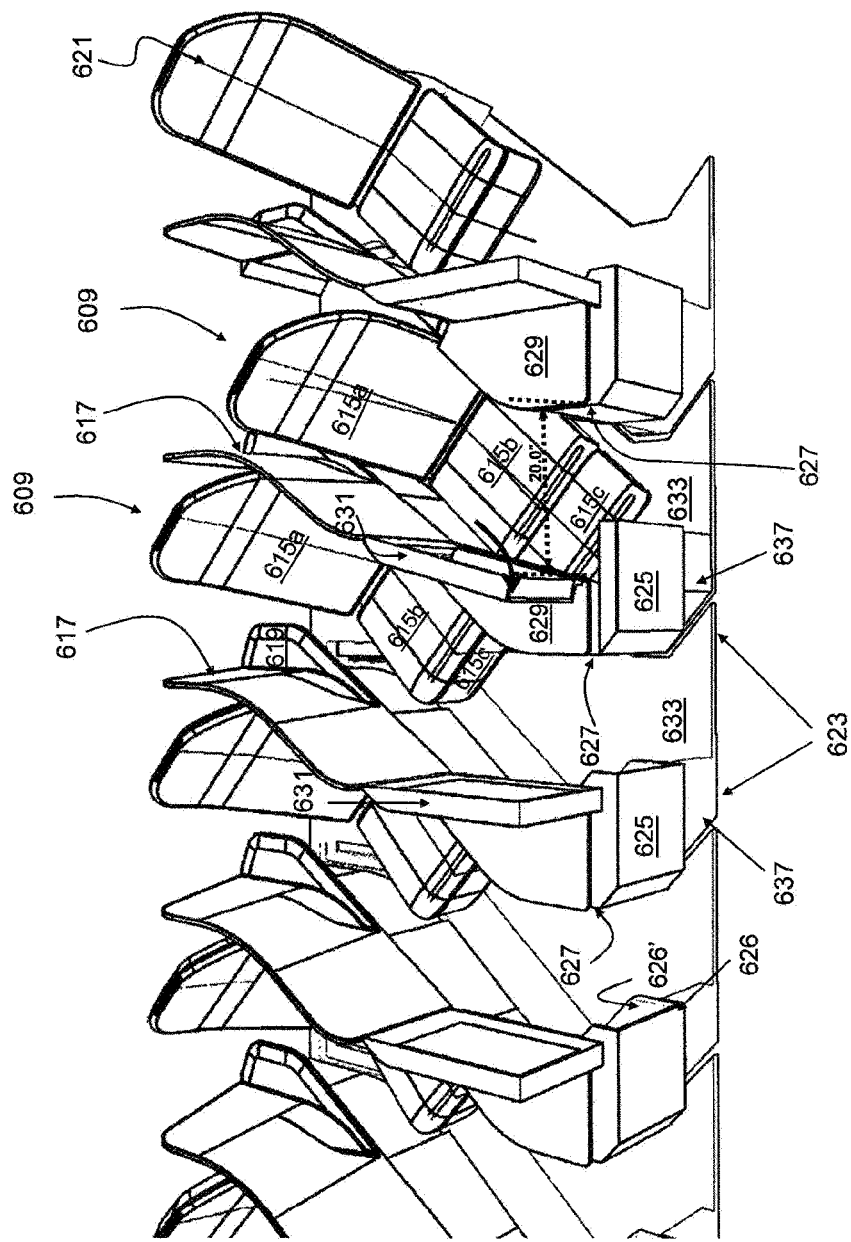
Figure 6C:
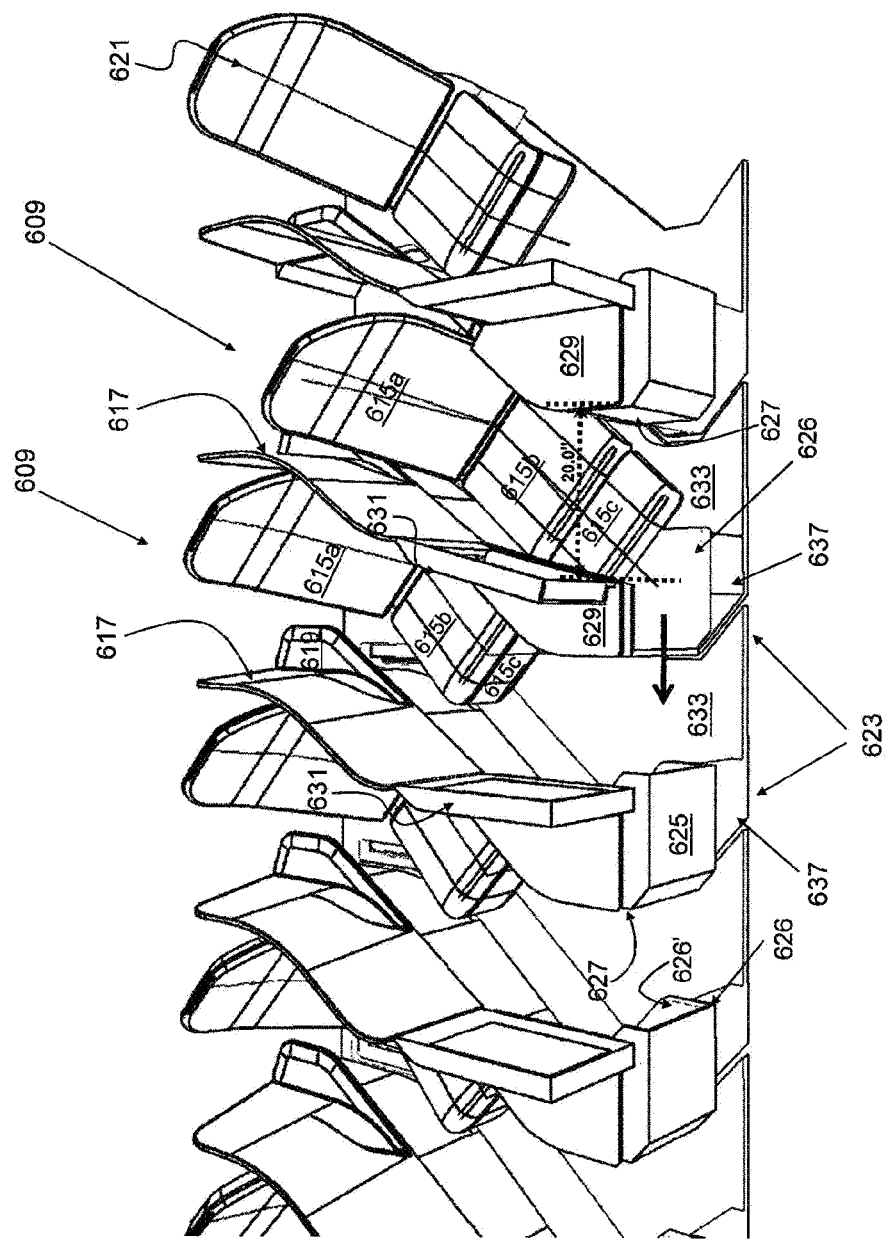
Figure 6D:
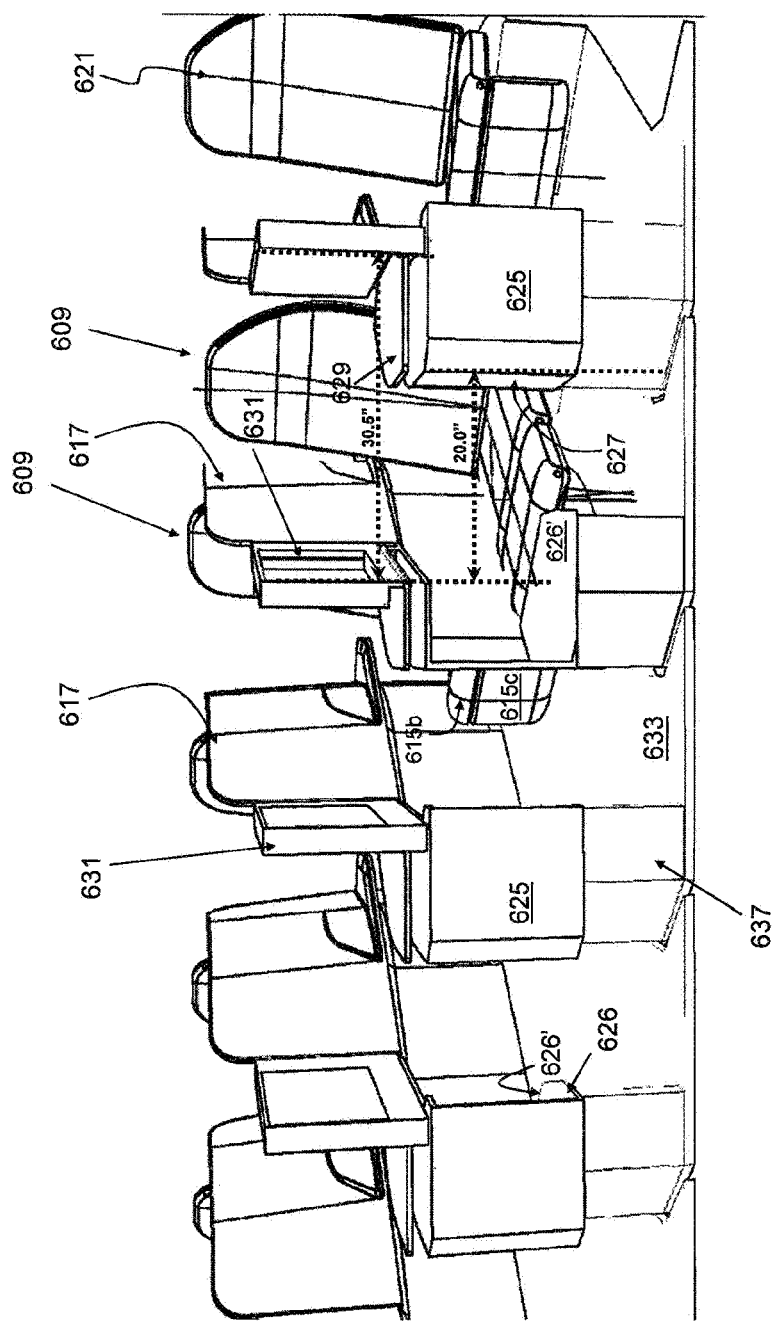

FIGS. 6*a* to 6*d* show another embodiment that is a variant of the fifth embodiment. In this embodiment the monitor 631 is perpendicular to the aisle 611 when it is in its stowed position. When the seat unit 609 is configured into the disabled-access configuration, the monitor 631 is moved to an access position (see FIG. 6*b*) in which it is rotated forwards to widen the gap between it and the monitor 631 the other side of the access opening 633 from 25.5 inches (FIG. 6*a*) to 30.5 inches (FIG. 6*d*). This is provided in combination with the removal of the end-wall 625 to not only provide a wider access opening, but to also give the passenger more space to manoeuvre their upper body as they access the seat unit (see, e.g., FIG. 6C).

The embodiment of FIGS. 6*a*-6*d* provides a larger table surface 629 than the arrangement in the fifth embodiment (because of the stowed position of the monitor 631), but this is a trade off with there being a slight impact on the adjacent (fore) passenger when the seat unit 609 is converted into the disabled-access configuration (by virtue of the monitor 631 being needed to move to the access position).

Figure 7A:
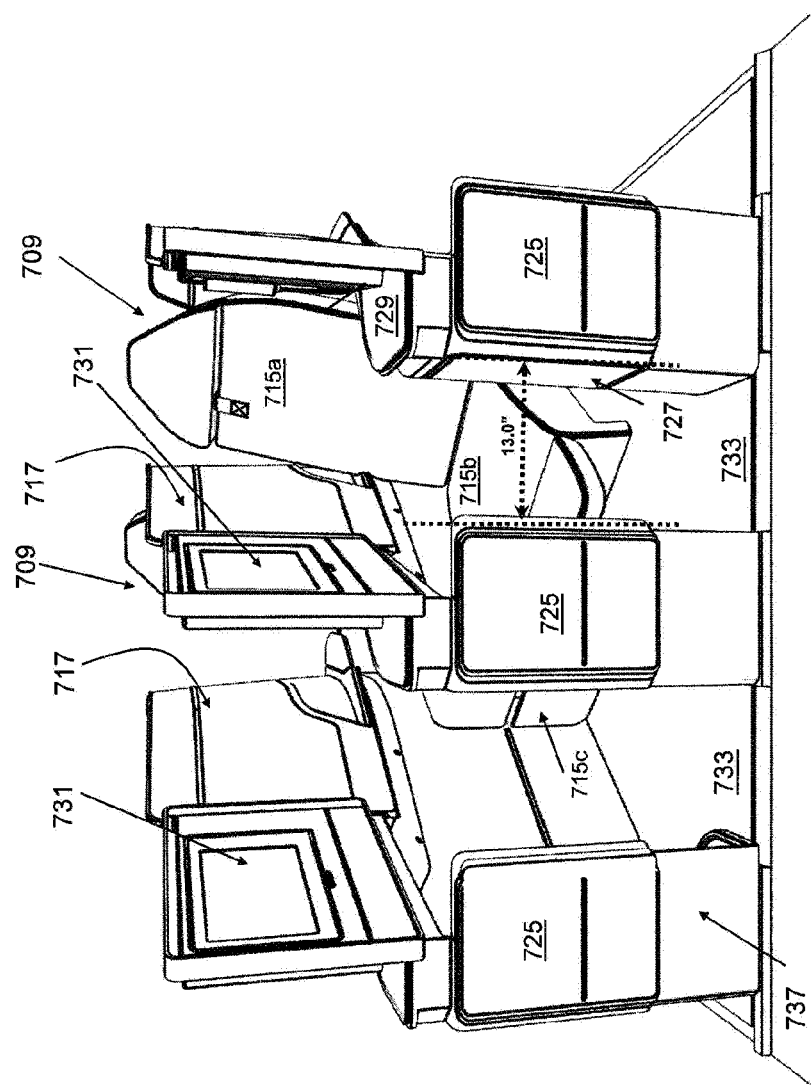
FIGS. 7a to 7d show part of a column of seat units in an arrangement according to a seventh embodiment, one of the seat units being shown as it changes into the disabled-access configuration.
Figure 7B:
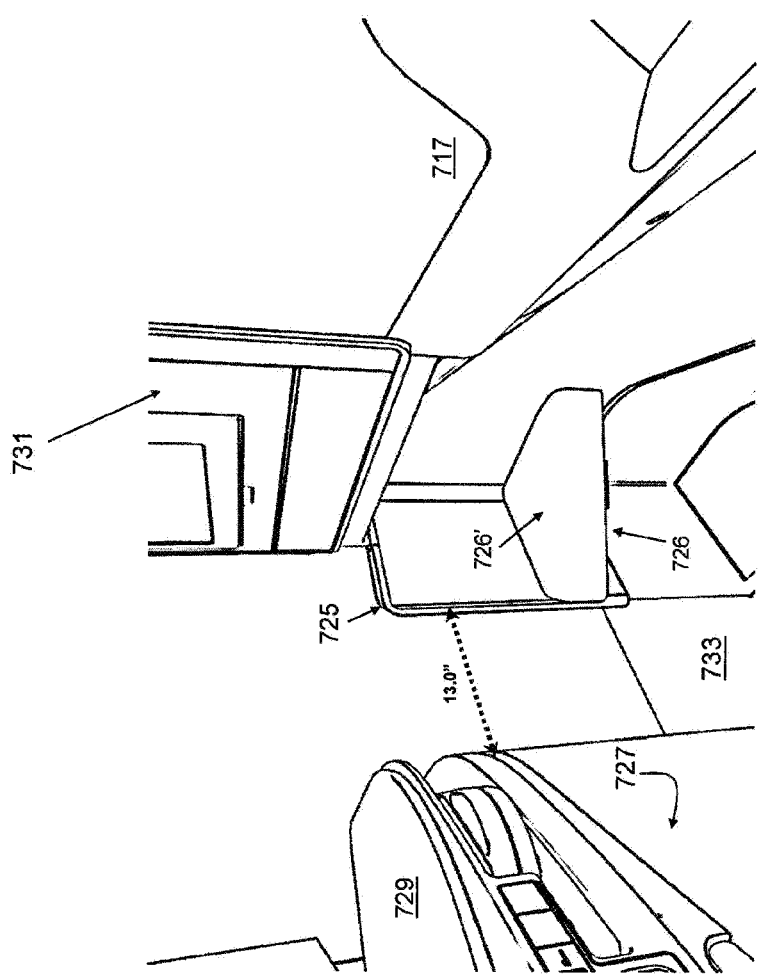

FIGS. 7*a* to 7*d* show another embodiment that is a variant of the fifth and sixth embodiments. In this embodiment the end-wall 725 is not detached in the disabled-access configuration. Instead, a panel forming the end-wall 725 is slideably mounted on a set of rails 728, which allow it to be translated, under a sliding motion, away from the access opening. FIG. 7*a* is a view from the aisle looking towards one of the seats, and FIG. 7*b* is a view from the seat looking out towards the aisle. In FIGS. 7*a* and 7*b* the unit is shown part-way moving from the able-bodied access configuration to the disabled configuration; namely the seat has been shifted forwards and the leg rest 715*c* is extended (as per FIG. 6*a* of the preceding embodiment).

Figure 7C:
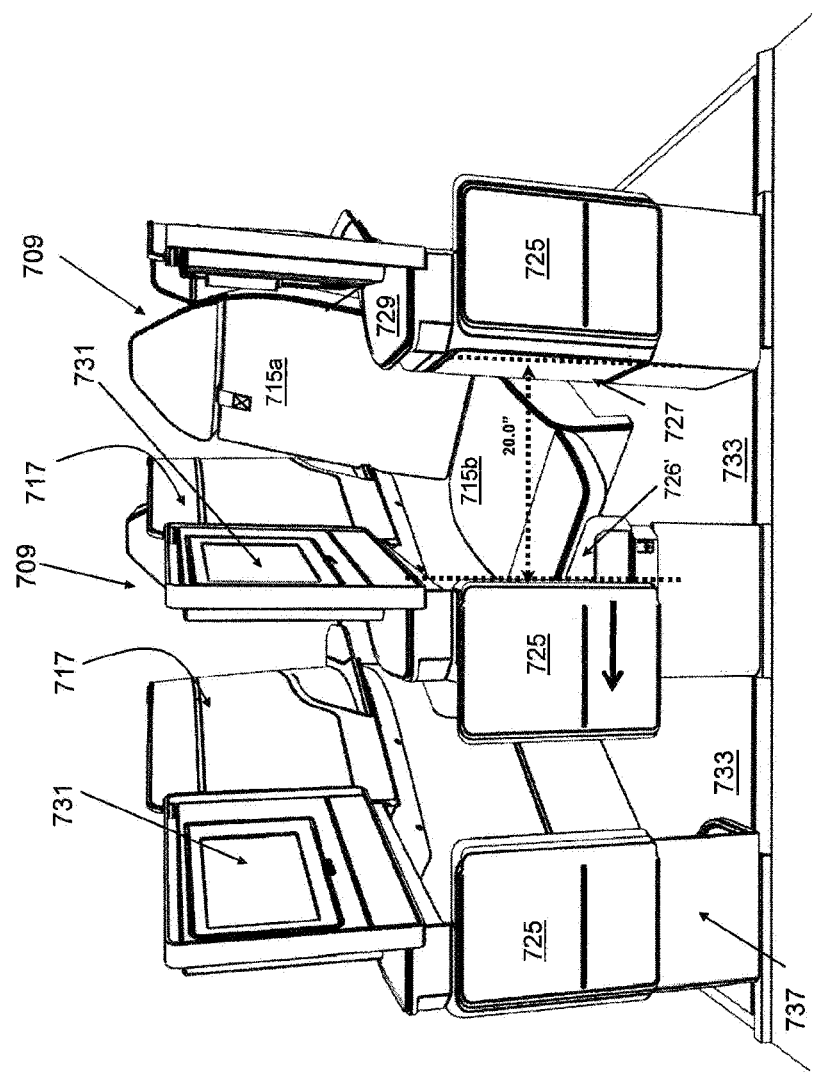
Figure 7D:
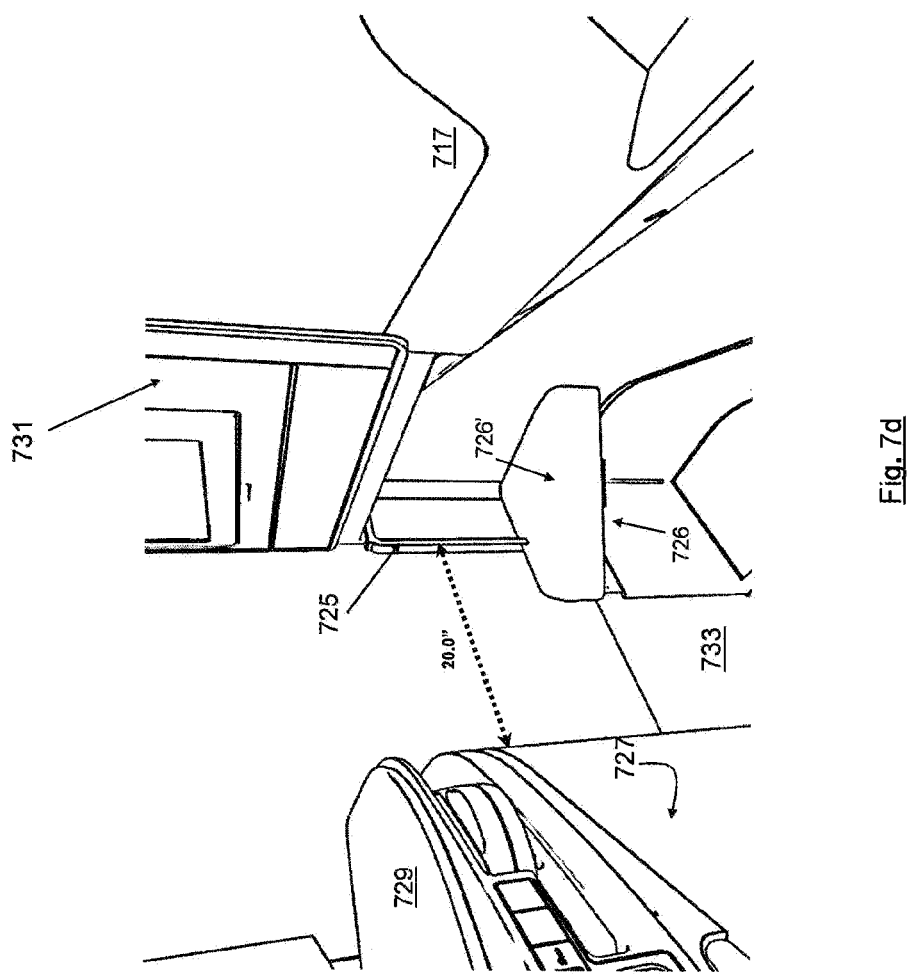

FIGS. 7*c* and 7*d* are the equivalent illustrations to Figured 7*a*/7*b*, but when the unit is in the disabled-access configuration. It can be readily seen from these Figures that the movement of the end-wall 725 to one side temporarily widens the access opening from 13 inches to 20 inches.

To revert to the able-bodied configuration, the panel of the end-wall 725 is slid back and releasably locked in place with a latch (not shown) until it next needs to be moved (for example for passenger egress). It has been identified that an arrangement in which the end-wall (or other structure than is moved to widen the access opening) remains attached, is beneficial as it avoids loose objects in the cabin that might otherwise be misplaced or cause a trip hazard.

Whilst the present invention has been described and illustrated with reference to particular embodiments, it will be appreciated by those of ordinary skill in the art that the invention lends itself to many different variations not specifically illustrated herein. By way of example only, certain possible variations will now be described:

The part of the foot-receiving structure in the fifth and sixth embodiments need not necessarily be fully removeable, and could remain attached in some embodiments. The part of the structure in the seventh embodiment may be moveable in other ways that are not necessarily slideable and/or pure translations, to move it to its temporary position to widen the access opening. In other embodiments, not shown, different parts of the foot receiving structure may be moveable to temporarily widen the access opening.

Whilst embodiments of the present invention tend to be most applicable to high angle/low pitch arrangements, the exact pitch, angle and width values need not necessarily be as described with reference to the above-mentioned embodiments.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A passenger seating arrangement in an aircraft cabin, the passenger seating arrangement comprising a column of seat units located adjacent an aisle, the column of seat units and the aisle both extending in a longitudinal direction parallel to the longitudinal axis of the aircraft cabin, and wherein
the column comprises a plurality of seat units, arranged consecutively along the longitudinal direction,
and wherein each seat unit comprises a plurality of moveable seating elements orientated at an acute angle to the longitudinal direction and facing inwardly towards the aisle,
and wherein each seat unit comprises a foot-receiving structure for receiving the feet of a passenger, the spacing between the foot-receiving structure of a first seat unit of the plurality of seat units and the foot-receiving structure of a second seat unit adjacent to the first seat unit in the column defining an access opening to the first seat unit,
wherein the access opening has a first width for access by an able-bodied passenger; and
wherein the first seat unit is configurable into a disabled-access configuration in which the access opening is temporarily widened from the first width to a second width, greater than the first width, for enabling a disabled passenger to access the first seat unit.

2. The passenger seating arrangement according to claim 1, wherein the second width is at least the width of the aisle.

3. The passenger seating arrangement according to claim 1, wherein the foot-receiving structure of each seat unit comprises an end-wall arranged to shield the passenger's feet from the aisle, and wherein at least part of the end-wall is moveable, so as to temporarily widen the access opening from the first width to the second width.

4. The passenger seating arrangement according to claim 1, wherein substantially all of the one of the foot-receiving structures bordering the access opening is moveable, so as to temporarily widen the access opening from the first width to the second width when the unit is in the disabled-access configuration.

5. The passenger seating arrangement according to claim 4, wherein the foot-receiving structure is rotatable to a rotated position, so as to temporarily widen the access opening from the first width to the second width when the unit is in the disabled-access configuration.

6. The passenger seating arrangement according to claim 4, wherein the foot-receiving structure is translatable to a translated position, so as to temporarily widen the access opening from the first width to the second width when the unit is in the disabled-access configuration.

7. The passenger seating arrangement according to claim 1, wherein the foot-receiving structure comprises an upper surface for forming a utility surface above the passenger's feet, the utility surface being for use by a passenger located in the adjacent seat unit, and wherein, the upper-surface is moveable, so as to temporarily widen the access opening from the first width to the second width when the unit is in the disabled-access configuration.

8. The passenger seating arrangement according claim 1, wherein each seat unit comprises an in-flight entertainment (IFE) monitor, the IFE monitor being configurable between a stowed position and an in-use position, and wherein the monitor is further configurable to an access position for facilitating access to the seat unit.

9. The passenger seating arrangement according to claim 8, wherein in the access position the spacing above the opening, between adjacent monitors, is widened relative to when the monitor is in the stowed position.

10. The passenger seating arrangement according to claim 1, wherein the acute angle at which the seating elements are orientated to the longitudinal direction is at least 45 degrees.

11. The passenger seating arrangement according to claim 1, wherein the pitch between consecutive seat units in the column is between 27 and 29 inches.

12. The passenger seating arrangement according to claim 1, wherein the column of seat units is adjacent the aisle on one side, and adjacent the aircraft sidewall on the other side.

13. The passenger seating arrangement according to claim 12, wherein the cabin comprises a second column of seat units on the opposite side of the aisle, the second column being arranged as described with reference to the first column.

* * * * *